United States Patent
Shao et al.

(10) Patent No.: US 12,498,128 B2
(45) Date of Patent: Dec. 16, 2025

(54) MULTI-MODE AIR SUPPLY TERMINAL AND METHOD

(71) Applicant: University of Science and Technology Beijing, Beijing (CN)

(72) Inventors: Xiaoliang Shao, Beijing (CN); Yemin Liu, Beijing (CN); Chengxu Jin, Beijing (CN); Yu Liu, Beijing (CN); Xueying Wen, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 3 days.

(21) Appl. No.: 18/596,754

(22) Filed: Mar. 6, 2024

(65) Prior Publication Data

US 2024/0263815 A1  Aug. 8, 2024

(30) Foreign Application Priority Data

Mar. 7, 2023 (CN) .......................... 202310211199.1

(51) Int. Cl.
*F24F 9/00* (2006.01)
*F24F 11/00* (2018.01)
(Continued)

(52) U.S. Cl.
CPC ............ *F24F 9/00* (2013.01); *F24F 11/0001* (2013.01); *F24F 11/65* (2018.01); *F24F 11/79* (2018.01);
(Continued)

(58) Field of Classification Search
CPC .......... F24F 9/00; F24F 11/0001; F24F 11/65; F24F 11/79; F24F 11/80; F24F 13/075;
(Continued)

(56) References Cited

U.S. PATENT DOCUMENTS

| 5,180,333 A | * | 1/1993 | Shyu | ...................... F24F 11/56 454/319 |
| 6,079,626 A | * | 6/2000 | Hartman | ............. F24F 1/00075 236/13 |

(Continued)

FOREIGN PATENT DOCUMENTS

| CN | 1896631 A | | 1/2007 |
| CN | 105864928 A | * | 8/2016 |

(Continued)

OTHER PUBLICATIONS

Xianting Li et al., "Discussion on the application of multi-mode ventilation", Journal of Guangzhou University(Natural Science Edition), vol. 9, No. 2, Apr. 30, 2010, pp. 51-56.

*Primary Examiner* — Edelmira Bosques
*Assistant Examiner* — Frances F. Hamilton

(57) ABSTRACT

The present invention discloses a multi-mode air supply terminal and method, and relates to the technical field of indoor ventilation. The multi-mode air supply terminal includes: a shell body (2) as well as a pore-plate air supply mechanism and an air-curtain air supply mechanism which are installed inside the shell body; the shell body is connected with one end of an air supply branch pipe), the air-curtain air supply mechanism is arranged around the pore-plate air supply mechanism, and an inner wall of the shell body (2) forms an empty cavity (6) with the pore-plate air supply mechanism and the air-curtain air supply mechanism; and the pore-plate air supply mechanism and the air-curtain air supply mechanism are respectively used for controlling opening/closing of a pore-plate air supply port and an air-curtain air supply port to form a plurality of air supply modes.

7 Claims, 20 Drawing Sheets

(51) Int. Cl.
*F24F 11/65* (2018.01)
*F24F 11/79* (2018.01)
*F24F 11/80* (2018.01)
*F24F 13/075* (2006.01)
*F24F 120/12* (2018.01)

(52) U.S. Cl.
CPC ............ *F24F 11/80* (2018.01); *F24F 13/075* (2013.01); *F24F 2120/12* (2018.01); *F24F 2221/38* (2013.01)

(58) Field of Classification Search
CPC ............... F24F 2120/12; F24F 2221/38; F24F 2003/005; F24F 2003/0446; F24F 2003/003; F24F 1/00075; F24F 3/044; F24F 13/12
USPC ......................................................... 454/188
See application file for complete search history.

(56) References Cited

U.S. PATENT DOCUMENTS

| | | | | |
|---|---|---|---|---|
| 7,193,682 | B2 * | 3/2007 | Yonekawa | H01L 21/67248 414/221 |
| 11,301,779 | B2 * | 4/2022 | Song | F24F 11/64 |
| 2011/0190945 | A1 * | 8/2011 | Yoshii | F24F 11/30 700/277 |
| 2017/0087500 | A1 * | 3/2017 | Combs | B01D 46/429 |
| 2017/0261215 | A1 * | 9/2017 | Kwon | F24F 1/0033 |
| 2022/0170649 | A1 * | 6/2022 | Chen | F24F 7/08 |
| 2022/0249728 | A1 * | 8/2022 | Lee | F24F 9/00 |
| 2022/0252287 | A1 * | 8/2022 | Liu | F24F 9/00 |
| 2022/0252295 | A1 * | 8/2022 | Liu | F24F 7/003 |
| 2022/0373197 | A1 * | 11/2022 | Hyon | F24F 1/0073 |
| 2023/0304700 | A1 * | 9/2023 | Shin | F24F 1/0011 |

FOREIGN PATENT DOCUMENTS

| | | | | |
|---|---|---|---|---|
| CN | 109520066 | A * | 3/2019 | .......... F24F 11/0001 |
| CN | 113701239 | A | 11/2021 | |
| CN | 114234356 | A | 3/2022 | |
| EP | 1659346 | A2 | 5/2006 | |
| JP | 2011030719 | A * | 2/2011 | |
| JP | 2014077599 | A * | 5/2014 | |
| KR | 20150004575 | A * | 1/2015 | |
| KR | 101706504 | B1 * | 2/2017 | |
| WO | WO-2010131112 | A1 * | 12/2010 | ............ F24F 13/068 |
| WO | WO-2022027101 | A1 * | 2/2022 | |

* cited by examiner

MULTI-MODE AIR SUPPLY TERMINAL AND METHOD

CROSS-REFERENCE TO RELATED APPLICATIONS

This application claims the benefit of priority from Chinese Patent Application No. 202310211199.1, filed on Mar. 7, 2023. The content of the aforementioned application, including any intervening amendments thereto, is incorporated herein by reference in its entirety.

TECHNICAL FIELD

The present invention relates to the technical field of indoor ventilation, and specifically relates to a multi-mode air supply terminal and method.

BACKGROUND

With the development of the economy, a requirement of people on a healthy, comfortable, and personalized indoor air environment is increasing. A building environment is highly susceptible to the harm of suddenly-released toxic gases, airborne viruses, etc., and protection for respiratory health of a person is the primary task; efficient indoor ventilation and air exchange, removal for various pollutants present in daily life, and effective protection for a freshness degree of air in an exhalation area of the person are important tasks; and in addition, different persons in building rooms have respective thermal preferences for a thermal environment, and hope to carry out personalized and precise adjustment and control on the indoor thermal environment. The above three types of demands involve building spaces with various functions, and in particular, under the situation of sick building syndrome, VOCs pollution caused by building decoration, haze weather, COVID-19, and thermal environment creation for personalized requirements, which are emerged successively in recent years, an indoor air supply terminal should give consideration to healthy, comfortable, and personalized parameter guarantee.

At present, an air supply terminal with traditional overall ventilation or personalized ventilation is single in structure and function, and cannot simultaneously meet many demands such as efficient ventilation and air exchange, pollution source control, suppression for external pollution invasion, personalized thermal comfort adjustment and control, and combination normal time with emergency, therefore, development for an efficient air supply terminal capable of flexibly adapting to many parameter demands is of great significance.

SUMMARY

The present invention provides a multi-mode air supply terminal and method, where through switching a plurality of air supply modes, not only can thermal comfort of the indoor person be guaranteed, but pollutants can also be blocked.

According to a first aspect of examples of the present invention, a multi-mode air supply terminal is provided, and includes:
- a shell body (2) as well as a pore-plate air supply mechanism and an air-curtain air supply mechanism which are installed inside the shell body (2); the shell body (2) is connected with one end of an air supply branch pipe (1), the air-curtain air supply mechanism is arranged around the pore-plate air supply mechanism, and an inner wall of the shell body (2) forms an empty cavity (6) with the pore-plate air supply mechanism and the air-curtain air supply mechanism; and
- the pore-plate air supply mechanism and the air-curtain air supply mechanism are respectively used for controlling opening/closing of a pore-plate air supply port and an air-curtain air supply port to form a plurality of air supply modes, so that functions of thermal comfort guarantee, pollutant blocking, as well as ventilation and air exchange are realized.

According to a second aspect of the examples of the present invention, a multi-mode air supply method is provided, and includes:
- acquiring position information of a target to be supplied with air, and ventilation demand information, where the ventilation demand information includes a set temperature and/or a limited concentration of pollutants;
- determining an air supply terminal closest to the target to be supplied with air according to the position information of the target to be supplied with air, where the air supply terminal is provided with a plurality of air supply modes;
- determining a target air supply mode and a target air supply parameter corresponding to the air supply terminal according to the position information of the target to be supplied with air, and the ventilation demand information; and
- controlling the air supply terminal to carry out air supply on the basis of the target air supply mode and the target air supply parameter.

According to a third aspect of the examples of the present invention, a multi-mode air supply apparatus is provided, and includes:
- an acquisition unit used for acquiring position information of a target to be supplied with air, and ventilation demand information, where the ventilation demand information includes a set temperature and/or a limited concentration of pollutants;
- a determination unit used for determining an air supply terminal closest to the target to be supplied with air according to the position information of the target to be supplied with air, where the air supply terminal is provided with a plurality of air supply modes; and the determination unit is further used for determining a target air supply mode and a target air supply parameter corresponding to the air supply terminal according to the position information of the target to be supplied with air, and the ventilation demand information; and
- a control unit used for controlling the air supply terminal to carry out air supply on the basis of the target air supply mode and the target air supply parameter.

According to a fourth aspect of the examples of the present invention, a computer-readable storage medium is provided, a computer program is stored in the computer-readable storage medium, and the following steps are realized when the program is executed by a processor.
- acquiring position information of a target to be supplied with air, and ventilation demand information, where the ventilation demand information includes a set temperature and/or a limited concentration of pollutants;
- determining an air supply terminal closest to the target to be supplied with air according to the position information of the target to be supplied with air, where the air supply terminal is provided with a plurality of air supply modes;
- determining a target air supply mode and a target air supply parameter corresponding to the air supply terminal according to the position information of the target to be supplied with air, and the ventilation demand information; and controlling the air supply terminal to carry out air supply on the basis of the target air supply mode and the target air supply parameter.

According to a fifth aspect of the examples of the present invention, an electronic device is provided, and includes a memory, a processor, and a computer program stored in the memory and capable of running in the processor, and the following steps are realized when the program is executed by the processor.

acquiring position information of a target to be supplied with air, and ventilation demand information, where the ventilation demand information includes a set temperature and/or a limited concentration of pollutants;

determining an air supply terminal closest to the target to be supplied with air according to the position information of the target to be supplied with air, where the air supply terminal is provided with a plurality of air supply modes;

determining a target air supply mode and a target air supply parameter corresponding to the air supply terminal according to the position information of the target to be supplied with air, and the ventilation demand information; and controlling the air supply terminal to carry out air supply on the basis of the target air supply mode and the target air supply parameter.

The innovation points of the examples of the present invention include:

1. one of the innovative points of the examples of the present invention is that through the structural design of the air supply terminal, flexible switching may be carried out among the plurality of air supply modes, so that functions of personalized thermal comfort guarantee, pollutant blocking, as well as ventilation and air exchange are realized;
2. one of the innovative points of the examples of the present invention is that through adopting the air-curtain air supply mode, an air barrier may be formed around the indoor person to prevent cross contamination of toxic and harmful substances;
3. one of the innovative points of the examples of the present invention is that through short-distance air supply, the freshness degree of air in the exhalation area is effectively guaranteed; and
4. one of the innovative points of the examples of the present invention is that through flexibly adjusting the air supply parameter, a dynamic guarantee for the personalized thermal preference in the area of the person is realized.

According to the multi-mode air supply terminal and method, which are provided by the present invention, compared with the prior art, through controlling opening/closing of the pore-plate air supply port and the air-curtain air supply port in the air supply terminal, flexibly switching can be carried out among the plurality of air supply modes, so that functions of thermal comfort guarantee, pollutant blocking, ventilation and air exchange, etc. can be realized, that is, the air supply terminal designed by the present invention can not only dynamically guarantee the personalized thermal preference of the indoor person, but also prevent cross contamination of toxic and harmful substances, and guarantee the freshness degree of the air in the breathing area of the person.

The above description is merely an overview for the technical solutions of the present application, in order to have a clearer understanding for the technical means of the present application to implement in accordance with the contents of the specification, and in order to make the above and other purposes, features and advantages of the present application more obvious and understandable, specific implementation manners of the present application are specially described below.

BRIEF DESCRIPTION OF DRAWINGS

In order to describe the technical solutions in the examples of the present invention or in the prior art more clearly, the drawings required to be used in the description for the examples or the prior art will be briefly introduced below, and apparently, the drawings in the description below show merely some examples of the present invention, and those of ordinary skill in the art may further derive other drawings from these drawings without any creative efforts.

FIGS. 13A, 13B, 13C, 13D and 13E are schematic diagrams of a plurality of air supply modes provided by the examples of the present invention;

DETAILED DESCRIPTION OF THE EMBODIMENTS

The technical solutions in the examples of the present invention are clearly and completely described below in conjunction with the drawings in the examples of the present invention, and apparently, the examples described are merely a part rather than all of the examples of the present invention. All other examples obtained by those of ordinary skills in the art without creative efforts on the basis of the examples of the present invention shall fall within the protection scope of the present invention.

It needs be noted that, the terms "including" and "having", and any variations thereof in the examples and the drawings of the present invention are intended to cover non-exclusive inclusion. For example, processes, methods, systems, products or devices that include a series of steps or units are not limited to the listed steps or units, but alternatively further include unlisted steps or units, or alternatively further include other steps or units inherent to these processes, methods, products or devices.

Figure 1:
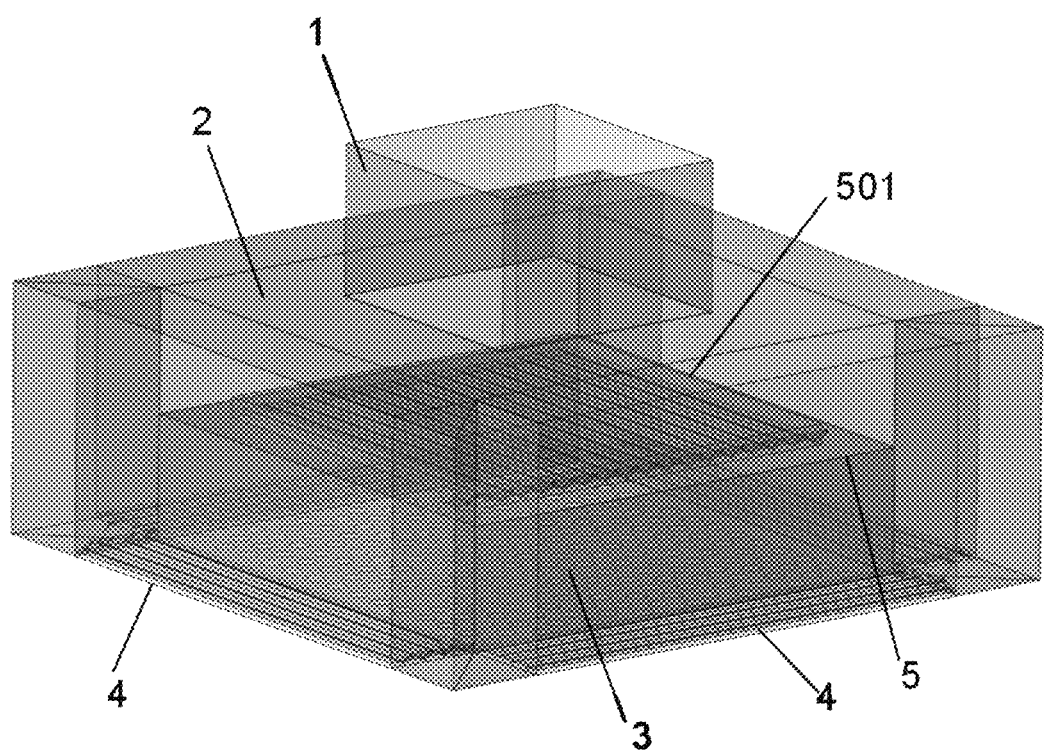
FIG. 1 is a structural schematic diagram of a multi-mode air supply terminal, which is provided by examples of the present invention.
Figure 2:
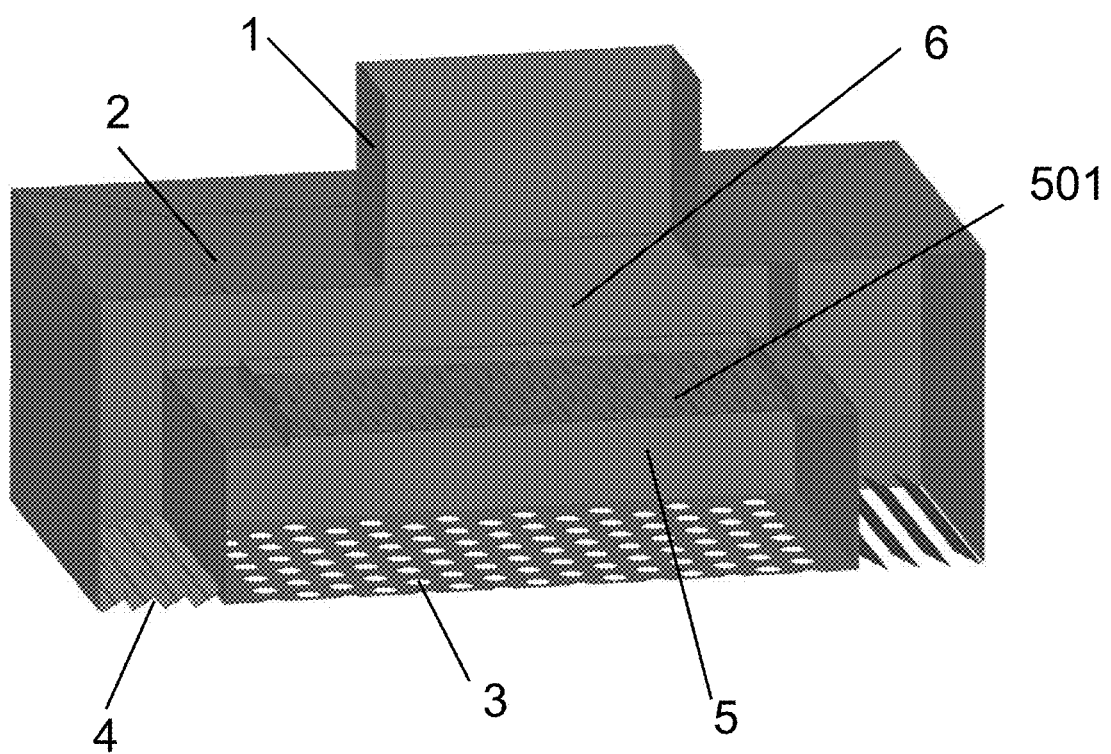
FIG. 2 is a schematic diagram of a section structure of the air supply terminal provided by the examples of the present invention.

At present, an air supply mode adopting a traditional overall ventilation manner or a personalized ventilation manner is single, and difficult to simultaneously realize functions of fresh air ventilation, pollution control, personalized thermal comfort, etc. In order to overcome the above shortcomings, the examples of the present invention provide a multi-mode air supply terminal, and as shown in FIG. 1 and FIG. 2, the apparatus includes: a shell body 2 as well as a pore-plate air supply mechanism and an air-curtain air supply mechanism which are installed inside the shell body 2; the shell body 2 is connected with one end of an air supply branch pipe 1, the air-curtain air supply mechanism is arranged around the pore-plate air supply mechanism, and an inner wall of the shell body 2 forms an empty cavity 6 with the pore-plate air supply mechanism and the air-curtain air supply mechanism 4; and the pore-plate air supply mechanism and the air-curtain air supply mechanism 4 are respectively used for controlling opening/closing of a pore-plate air supply port and an air-curtain air supply port to form a plurality of air supply modes, so that functions of thermal comfort guarantee, pollutant blocking, as well as ventilation and air exchange are realized.

The plurality of air supply modes include a pore-plate air supply mode, an air-curtain air supply mode, an air curtain-pore plate combined air supply mode, a mixed air supply mode, and a directional air supply mode.

If the target to be supplied with air is located at an indoor set position, and an environment parameter selected by the target to be supplied with air is the set temperature, then the pore-plate air supply mode may be adopted to meet personalized thermal preference of the target to be supplied with air; if the target to be supplied with air is located at the indoor set position, there are sudden pollutants or infectious pathogens indoors, and the environment parameter selected by the target to be supplied with air is the limited concentration of pollutants, then the air-curtain air supply mode may be adopted to block invasion of the sudden pollutants and the pathogens into the target to be supplied with air or block spread of the pathogens emitted by the target to be supplied with air to other areas, so that the health of the person is guaranteed; if the target to be supplied with air is located at the indoor set position, there are no sudden pollutants or infectious pathogens indoors, and the environment parameter selected by the target to be supplied with air is the limited concentration of pollutants, then the pore-plate air supply mode may be adopted to guarantee daily ventilation and air exchange when there is no sudden air pollution or pathogen release; if the target to be supplied with air is located at the indoor set position, there are sudden pollutants or infectious pathogens indoors, and the environment parameters selected by the target to be supplied with air are the set temperature and the limited concentration of pollutants, then the air curtain-pore plate combined air supply mode may be adopted to guarantee the thermal preference and the health of the person simultaneously; if the target to be supplied with air is not located at the indoor set position, and the target to be supplied with air has a mixed air supply demand, then the mixed air supply mode may be adopted, aiming at guaranteeing a uniform indoor environment; and if the target to be supplied with air is not located at the indoor set position, and the target to be supplied with air does not have the mixed air supply demand, then the directional air supply mode is preferred to realize directional air supply when the person is not at a workstation through the position information of the person.

It needs to be noted that, in a specific application scenario, the object to be supplied with air may be an indoor person, and the set position may be a workstation of the indoor person.

When the air supply terminal adopts the pore-plate air supply mode, the air-curtain air supply port is closed, the pore-plate air supply port is opened, and the pore-plate air supply port carries out air supply according to the determined air supply temperature or air supply volume; when the air supply terminal adopts the air-curtain air supply mode, the pore-plate air supply port is closed, the air-curtain air supply port is opened, and the air-curtain air supply port carries out air supply according to the determined air supply volume; when the air supply terminal adopts the air curtain-pore plate combined air supply mode, the pore-plate air supply port and the air-curtain air supply port are opened simultaneously, and the pore-plate air supply port and the air-curtain air supply port respectively carry out air supply on the basis of the determined air supply temperature and air supply volume; when the air supply terminal adopts the mixed air supply mode, the pore-plate air supply port is closed, the air-curtain air supply port is opened, and the air supply angle is adjusted to the basic air supply angle; and when the air supply terminal adopts the directional air supply mode, the pore-plate air supply port is closed, and the air-curtain air supply port is opened, and the air supply angle is continuously adjusted with the change of the position of the target to be supplied with air.

Figure 3:
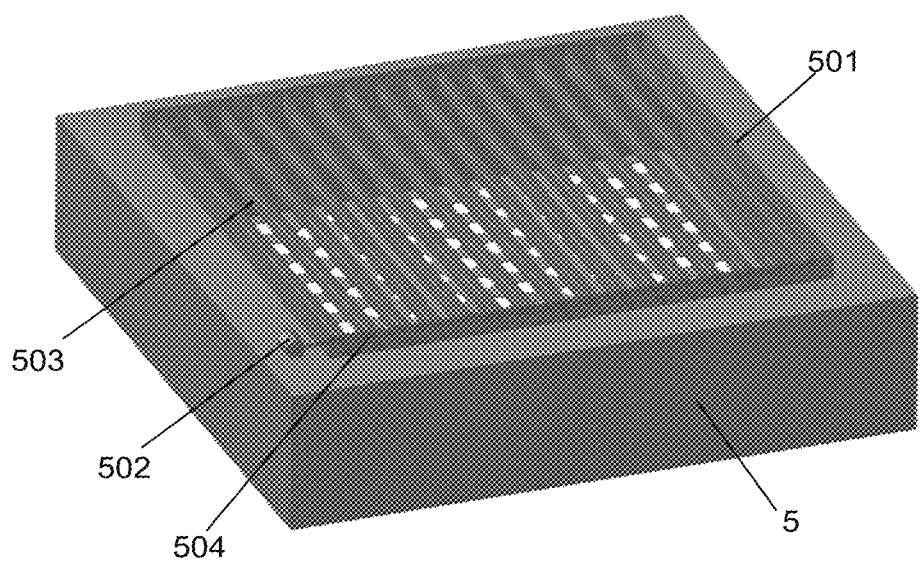
FIG. 3 is a structural schematic diagram of a pore-plate air supply mechanism provided by the examples of the present invention.

Further, the pore-plate air supply mechanism, as shown in FIG. 3, includes: a pore plate 3, a static-pressure box 5, and a pore-plate air valve 501; and the pore plate 3 is fixedly connected with one side of the static-pressure box 5, and the pore-plate air valve 501 is installed at the other side of the static-pressure box 5.

Figure 4:
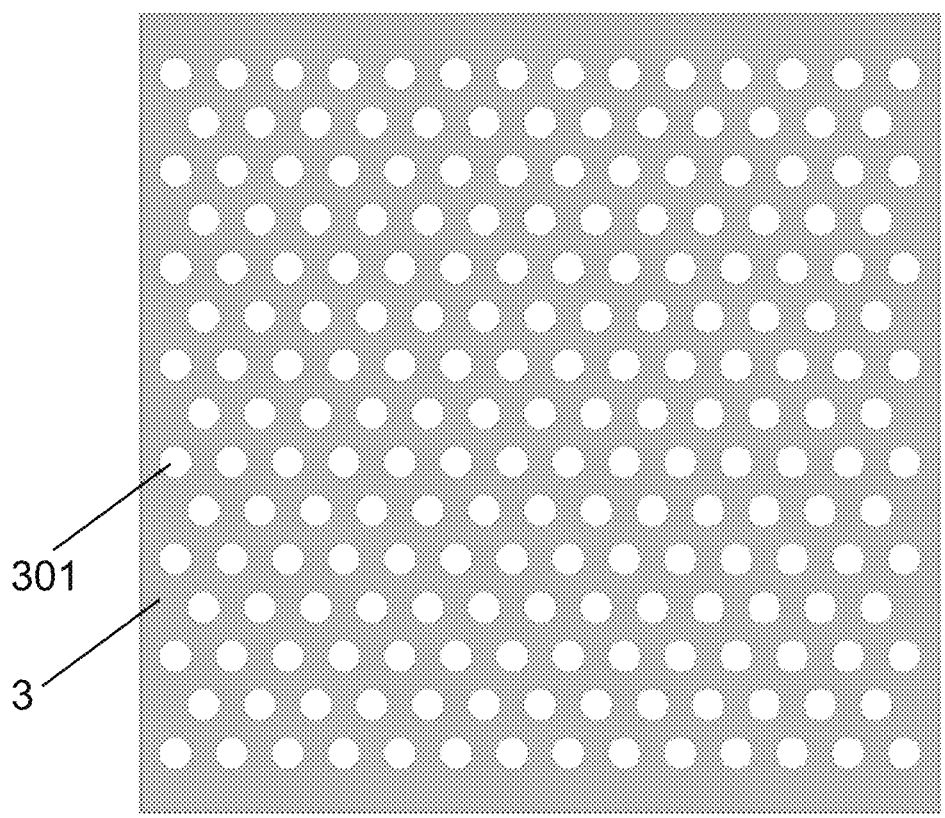
FIG. 4 is a structural schematic diagram of a pore plate provided by the examples of the present invention.

A plurality of air pores 301 are formed in the pore plate 3 to form the pore-plate air supply port, as shown in FIG. 4, the dimension of the pore-plate air supply port should be greater than a projection dimension of the target (indoor person) to be supplied with air on the ground to ensure that the section of air supply airflow may completely envelop the target to be supplied with air, the pore plate 3 may be a rectangular or a square, a layout form of the air pores 301 may be in the shape of a plum blossom or a chessboard, and the diameter of the air pores 301 may be a recommended value of 6 mm or 8 mm in the "Practical Heating and Air Conditioning Design Manual", or may be determined according to actual needs.

Figure 5:
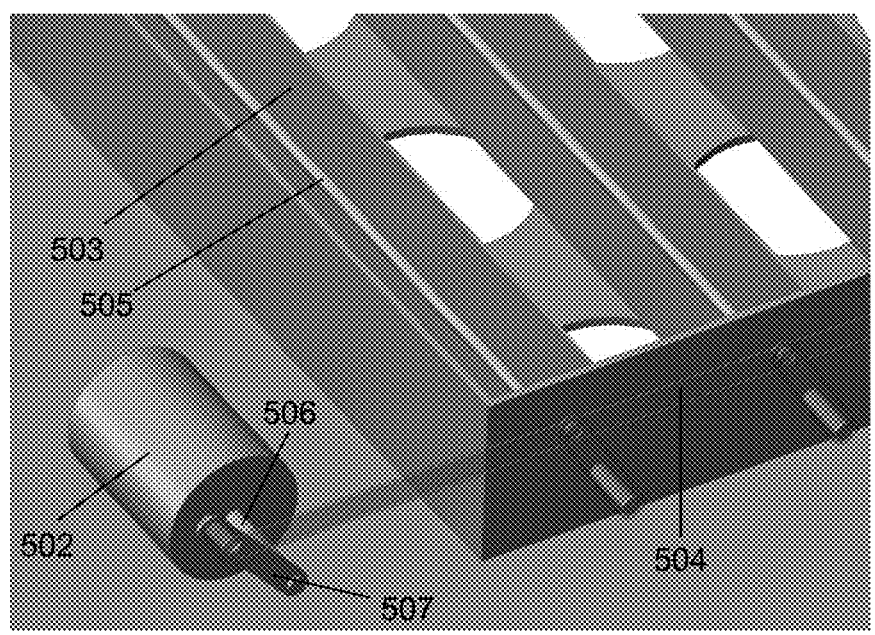
FIG. 5 is a structural schematic diagram of a pore-plate air valve provided by the examples of the present invention.

Further, the pore-plate air valve 501, as shown in FIG. 5, includes: a pore-plate air valve motor 502 and pore-plate air valve shutters 503; a plurality of first shutter rotating shafts 505 of the pore-plate air valve shutters 503 are connected through a first pore-plate air valve connecting rod 504, a motor shaft 506 of the pore-plate air valve motor 502 is connected with one end of a second pore-plate air valve connecting rod 507, and the other end of the second pore-plate air valve connecting rod 507 is connected with the first pore-plate air valve connecting rod 504; and the pore-plate air valve motor 502 is used for driving the second pore-plate air valve connecting rod (507) to rotate, and transmitting rotation motion to the first shutter rotating shafts 505 through the first pore-plate air valve connecting rod 504 to realize angle adjustment for the pore-plate air valve shutters 503.

An angle adjustment range for the pore-plate air valve shutters 503 is 0 degree to 90 degrees, and when the angles of the pore-plate air valve shutters 503 are adjusted to 0 degree, the pore-plate air supply port is closed. In addition, the other end of the second pore-plate air valve connecting rod 507 specifically may be connected with the first pore-plate air valve connecting rod 504 in a sliding manner.

Figure 6:
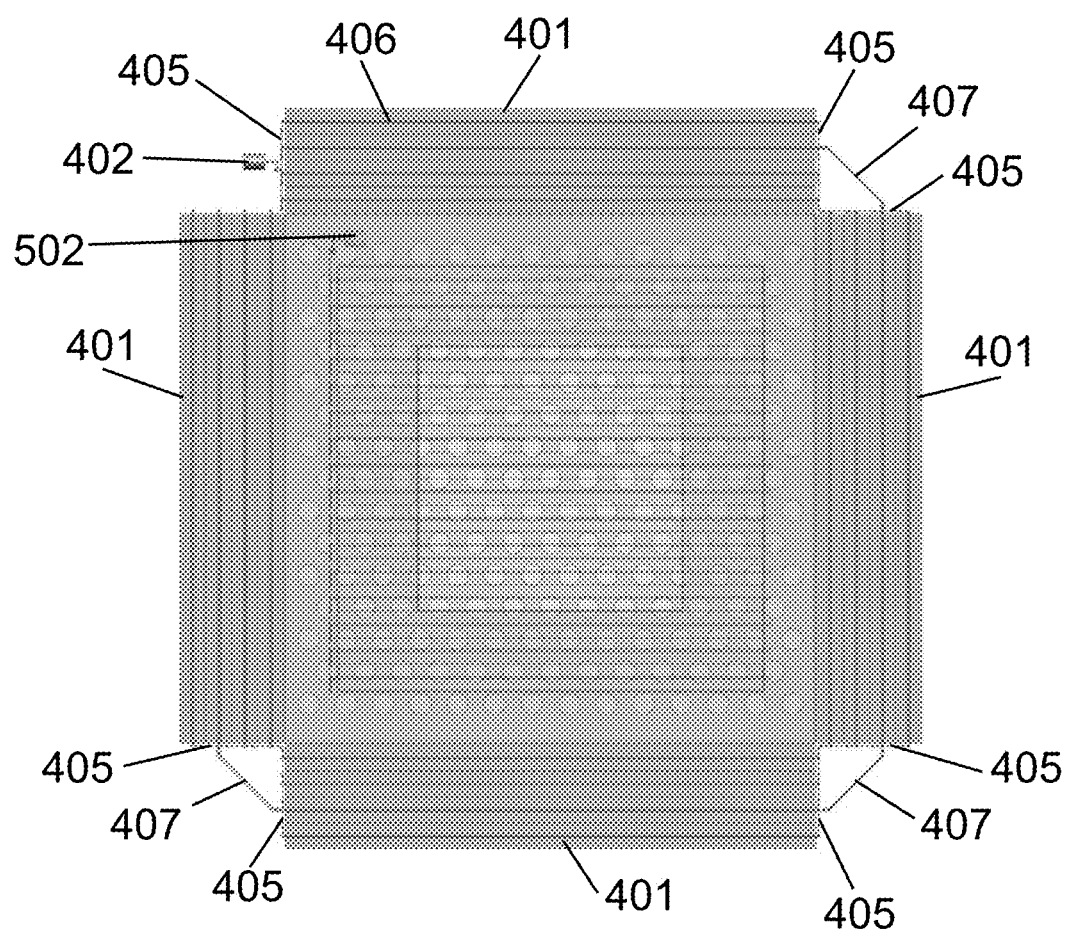
FIG. 6 is a schematic diagram of a top-view structure of an air-curtain air supply mechanism provided by the examples of the present invention.
Figure 7:
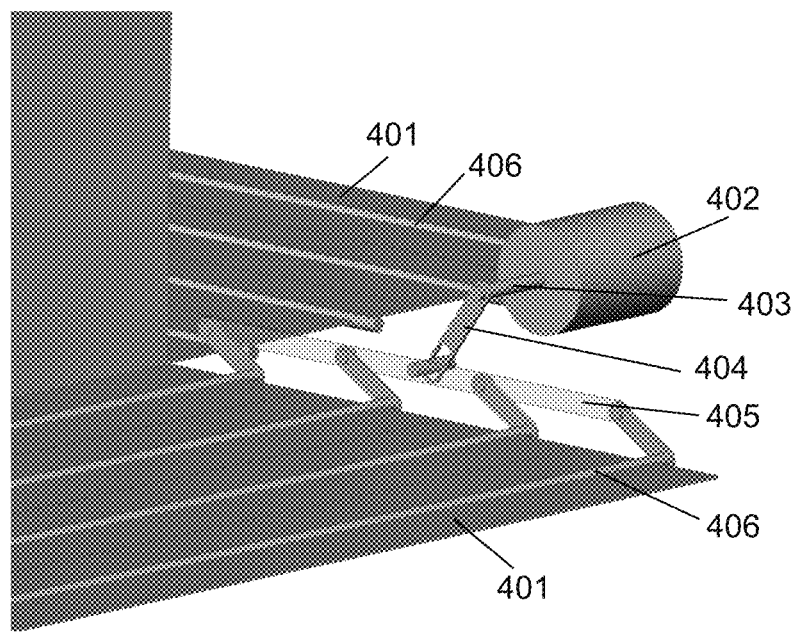
FIG. 7 is a schematic diagram of a close-shot structure of the air-curtain air supply mechanism provided by the examples of the present invention.

Further, the air-curtain air supply mechanism 4, as shown in FIG. 6 and FIG. 7, includes: air curtain shutters 401 arranged around the pore-plate air supply mechanism to form an air-curtain air supply port, and an adjustment motor 402 for the air curtain shutters, and a plurality of groups of the air curtain shutters 401 are connected with each other through a transmission mechanism; a plurality of second shutter rotating shafts 406 of the air curtain shutters 401 are connected through first air curtain connecting rods 405, a motor shaft 403 of the adjustment motor 402 for the air curtain shutters is connected with one end of a second air curtain connecting rod 404, and the other end of the second air curtain connecting rod 404 is connected with the first air curtain connecting rods 405; and the adjustment motor 402 for the air curtain shutters is used for driving the second air curtain connecting rod 404 to rotate, and transmitting rotation motion to the second shutter rotating shafts 406 through the first air curtain connecting rods 405 to realize angle adjustment for the air curtain shutters 401.

Figure 8:
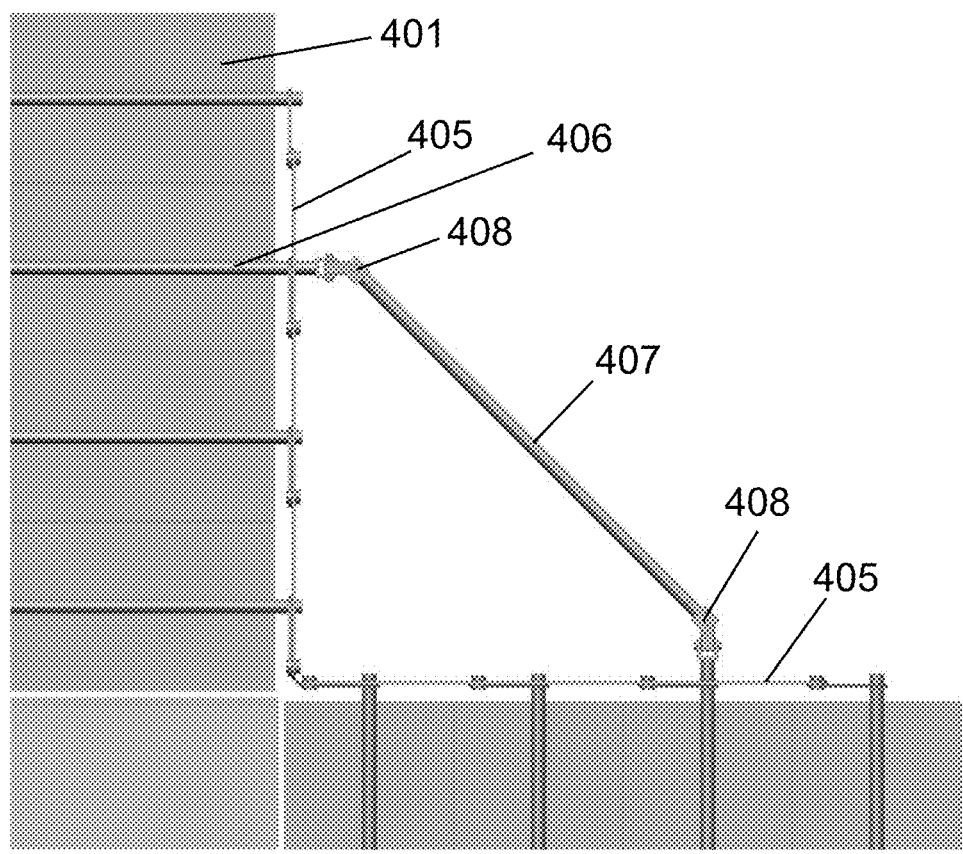
FIG. 8 is a schematic diagram of a top-view structure of a transmission mechanism provided by the examples of the present invention.
Figure 9:
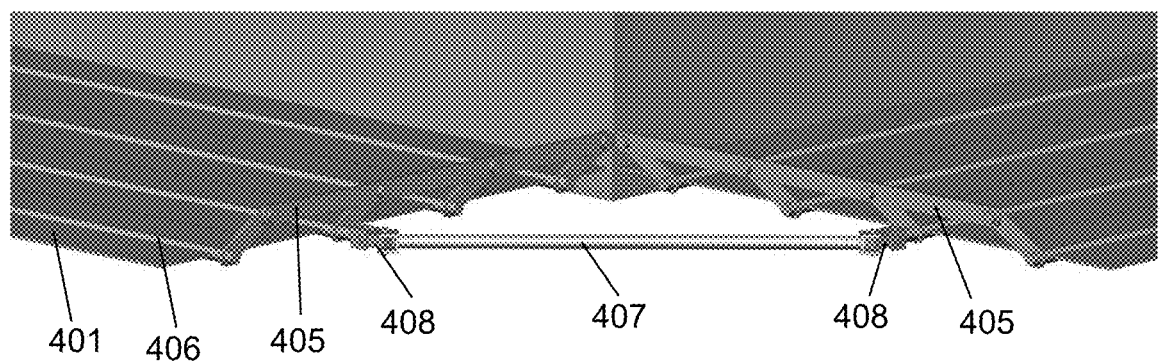
FIG. 9 is a schematic diagram of a close-shot structure of the transmission mechanism provided by the examples of the present invention.

The area of the rectangle encircled by the air curtain shutters 401 arranged around the pore-plate air supply port to form the air-curtain air supply port is greater than the projection dimension of the target (indoor person) to be supplied with air on the ground, and the section of the air supply airflow may completely envelop the target to be supplied with air. In addition, an angle adjustment range for the air curtain shutters 401 is 0 degree to 90 degrees, and when the angles of the air curtain shutters 401 are adjusted to 0 degree, the air-curtain air supply port is closed. Furthermore, the other end of the second air curtain connecting rod 404 specifically may be connected with the first air curtain connecting rods 405 in a sliding manner.

further, the transmission mechanism, as shown in FIG. 8 and FIG. 9, includes: a transmission shaft 407, and universal joints 408 fixedly installed at both sides of the transmission shaft 407; and the universal joints 408 at the both sides are respectively connected with the first air curtain connecting rods 405 of the two adjacent groups of air curtain shutters 401.

The air curtain shutters 401 arranged around the pore-plate air supply port may form four air-curtain air supply ports, and when angle adjustment for the air curtain shutters is carried out, only one adjustment motor for the air curtain shutters may be used, and simultaneous adjustment for the angles of the air curtain shutters of the four air-curtain air supply ports is realized through the transmission shaft 407. In addition, an adjustment motor for the air curtain shutters may also be installed at each air-curtain air supply port to realize independent adjustment for the angles of the air curtain shutters of the four air-curtain air supply ports.

According to the multi-mode air supply terminal, which is provided by the present invention, through controlling opening/closing of the pore-plate air supply port and the air-curtain air supply port in the air supply terminal, flexibly switching can be carried out among the plurality of air supply modes, so that functions of thermal comfort guarantee, pollutant blocking, ventilation and air exchange, etc. can be realized, that is, the air supply terminal designed by the examples of the present invention can not only dynamically guarantee the personalized thermal preference of the indoor person, but also prevent cross contamination of toxic and harmful substances, and guarantee the freshness degree of the air in the breathing area of the person; and in addition, compared with an existing personalized air supply terminal arranged near a desktop or a seat, the air supply terminal designed by the examples of the present invention can effectively reduce occupation for building space.

Figure 10:
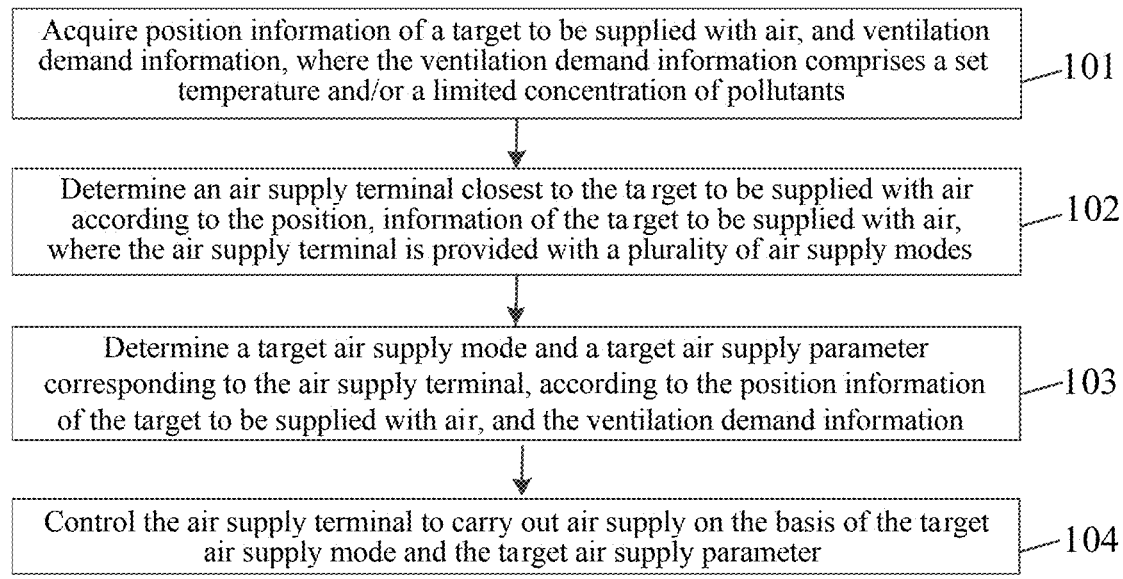
FIG. 10 is a schematic flow diagram of a multi-mode air supply method, which is provided by the examples of the present invention.

Further, the examples of the present invention further provide a multi-mode air supply method, and as shown in FIG. 10, the multi-mode air supply method includes:

step 101, acquiring position information of a target to be supplied with air, and ventilation demand information.

The target to be supplied with air specifically may be an indoor person, the position information specifically may be three-dimensional coordinates of a specific part of the target to be supplied with air, such as the three-dimensional coordinates of the head of the indoor person, and whether the indoor person is located at a workstation or located in other areas outside the workstation can be determined according to the position information. The ventilation demand information includes a set temperature and/or a limited concentration of pollutants.

The examples of the present invention are mainly applicable to scenarios that realize functions of thermal comfort guarantee, pollutant blocking, ventilation and air exchange, etc. through flexibly switching the plurality of air supply modes of the above air supply terminal. An executing subject in the examples of the present invention is an apparatus or a device capable of controlling the air supply terminal to carry out indoor air supply.

Specifically, the position information of the indoor target (indoor person) to be supplied with air may be acquired through technologies such as a position-sensing sensor, image recognition, and a portable locating terminal. Meanwhile, due to arrangement for demand information acquisition panels at different positions in a room, the target (indoor person) to be supplied with air may input air supply demand information through the nearby information acquisition panel, for example, the indoor person inputs own air supply demand information through the information acquisition panel at the workstation, and the air supply demand information includes a set temperature and/or a limited concentration of pollutants. In addition, the target (indoor person) to be supplied with air may further directly input the air supply demand information through an own mobile terminal, and the mobile terminal may communicate with a control terminal. Therefore, according to the above manner, the position information of the target (indoor person) to be supplied with air, and the ventilation demand information can be obtained, so that the air supply mode adopted by the air supply terminal is determined on the basis of the position information and the ventilation demand information.

Further, a mobile sensor or a fixed-workstation sensor may further be adopted to carry out environment data acquisition on a temperature or a concentration of pollutants near the person.

Step 102, determining the air supply terminal closest to the target to be supplied with air according to the position information of the target to be supplied with air.

A plurality of the air supply terminals as described in the terminal example are installed at the top of an indoor room, and the air supply terminal, as shown in FIG. 1 and FIG. 2, includes: a shell body 2 as well as a pore-plate air supply mechanism and an air-curtain air supply mechanism 4 which are installed inside the shell body 2; the shell body 2 is connected with one end of an air supply branch pipe 1, the air-curtain air supply mechanism 4 is arranged around the pore-plate air supply mechanism, and an inner wall of the shell body 2 forms an empty cavity 6 with the pore-plate air supply mechanism and the air-curtain air supply mechanism 4; and the pore-plate air supply mechanism and the air-curtain air supply mechanism 4 are respectively used for controlling opening/closing of a pore-plate air supply port and an air-curtain air supply port to form a plurality of air supply modes, so that functions of thermal comfort guarantee, pollutant blocking, as well as ventilation and air exchange are realized.

Further, the plurality of air supply modes include a pore-plate air supply mode, an air-curtain air supply mode, an air curtain-pore plate combined air supply mode, a directional air supply mode, and a mixed air supply mode.

For the examples of the present invention, in order to achieve a good air supply effect, the air supply terminal closest to the target (indoor person) to be supplied with air may be selected from the plurality of air supply terminals according to the position information of the target (indoor person) to be supplied with air.

Step 103, determining a target air supply mode and a target air supply parameter corresponding to the air supply terminal according to the position information of the target to be supplied with air, and the ventilation demand information.

The target air supply mode may be any one of a pore-plate air supply mode, an air-curtain air supply mode, an air curtain-pore plate combined air supply mode, a directional air supply mode, and a mixed air supply mode, and the target air supply parameter may be an air supply temperature, an air supply volume of the air-curtain air supply port, an air supply volume of the pore-plate air supply port, an air supply angle calculated in real time, a basic air supply angle, and other air supply parameters.

Figure 11A:
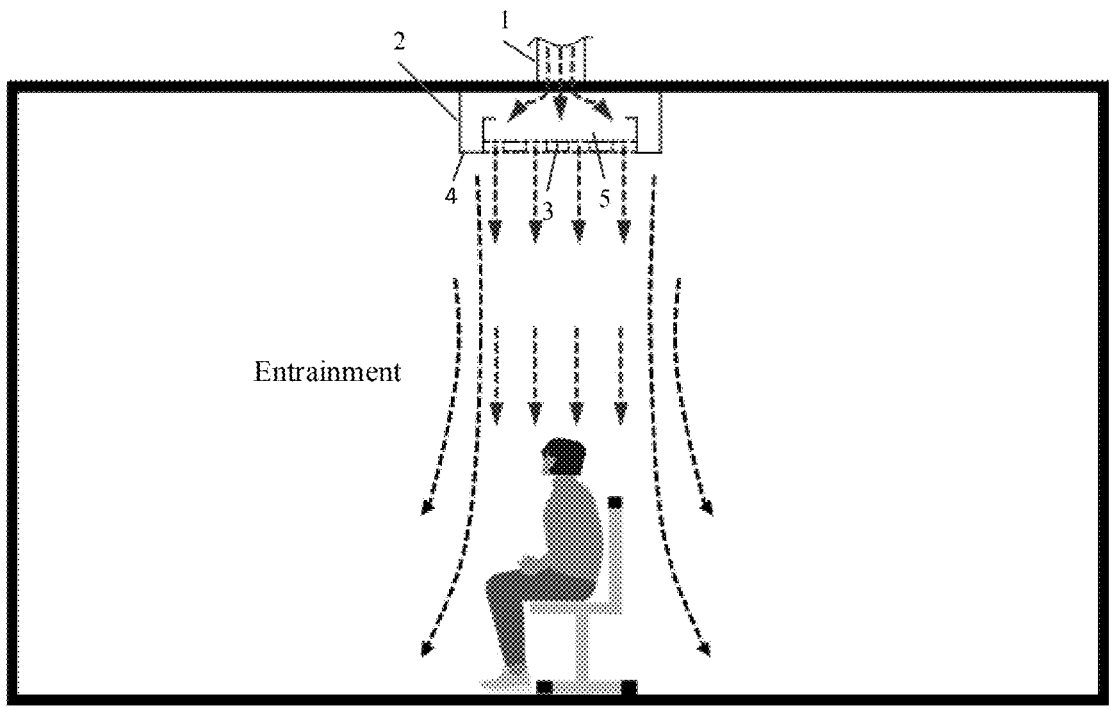
FIGS. 11A, 11B, 11C, 11D and 11E are schematic diagrams of a plurality of air supply scenarios provided by the examples of the present invention.

In a specific application scenario, as shown in FIG. 11A, determining the target to be supplied with air is located at a set position according to the position information, and determining the ventilation demand information is the set temperature, then the target air supply mode is determined to be a pore-plate air supply mode, an air supply temperature of the pore-plate air supply port is calculated according to the set temperature, and the air supply temperature of the pore-plate air supply port is determined to be the target air supply parameter.

The set position may be a workstation of the indoor person, and the set temperature is a demand temperature input by the target (indoor person) to be supplied with air. The pore-plate air supply mode is mainly used for meeting the personalized thermal demand of the indoor person. In addition, the area of the pore-plate air supply port is greater than the dimension of a traditional air port and the projection dimension of the person on the ground, and in the case of the same air volume, an air supply speed is low, and the person has no sense of blowing.

Further, a specific calculation process for the air supply temperature of the pore-plate air supply port includes: obtaining an initial environment temperature, an air supply density, intensity of a heat source, specific heat capacity of air, and an air supply volume of the pore-plate air supply port; determining first accessibility of the pore-plate air supply port to a position of the target to be supplied with air, and second accessibility of the heat source to the position of the target to be supplied with air; and calculating an air supply temperature of the pore-plate air supply port according to the set temperature, the initial environment temperature, the air supply density, the intensity of the heat source, the specific heat capacity of air, the air supply volume of the pore-plate air supply port, the first accessibility, and the second accessibility. A specific calculation formula is as follows:

$$\theta_{set}^{Target,j} = \sum_{n_S=1}^{N_S} \left[\theta_S^{n_S} a_{\theta,S}^{n_S,Target,j}\right] + \sum_{n_H=1}^{N_H} \left[\frac{q^{n_H}}{\rho C_p Q} a_{\theta,H}^{n_H,Target,j}\right]$$

where $\theta_{set}^{Target,j}$ is preferred temperature difference of the indoor person j, the preferred temperature difference $\theta_{set}^{Target,j}$ may be obtained by subtracting the set temperature from the known initial environment temperature, $\theta_S^{n_S}$ is temperature difference of the pore-plate air supply port, and the air supply temperature of the pore-plate air supply port may be obtained by adding the obtained temperature difference $\theta_S^{n_S}$ of the pore-plate air supply port to the initial air supply temperature of the pore-plate air supply port; $a_{\theta,S}^{n_S,Target,j}$ is the first accessibility of the $n_S$th pore-plate air supply port to the position of the target (indoor person j) to be supplied with air; $\rho$ is the air supply density, $q^{n_H}$ is the intensity of the $n_H$th heat source, $C_p$ is the specific heat capacity of air, Q is the air supply volume of the pore-plate air supply port, and specifically, the air supply volume of the pore-plate air supply port may be detected through a sensor; and $a_{\theta,H}^{n_H,Target,j}$ is the second accessibility of the $n_H$th heat source to the position of the target (indoor person j) to be supplied with air.

Further, a specific determination process for the first accessibility and the second accessibility includes: when the air supply temperature of the pore-plate air supply port increases from a preset initial temperature to a preset temperature, calculating a first temperature-increasing value of each indoor position; subtracting the preset initial temperature from the preset temperature to obtain an air supply temperature-increasing value of the pore-plate air supply port; dividing the first temperature-increasing value of each indoor position by the air supply temperature-increasing value to obtain accessibility of the pore-plate air supply port to each indoor position; when the heat source is turned on, calculating a second temperature-increasing value of each indoor position, and determining an average temperature-increasing value of indoor temperature increasing caused by the heat source; dividing the second temperature-increasing value of each indoor position by the average temperature-increasing value to obtain accessibility of the heat source to each indoor position; and respectively determining first accessibility of the pore-plate air supply port to the position of the target to be supplied with air, and second accessibility of the heat source to the position of the target to be supplied with air according to the position information of the target to be supplied with air, the accessibility of the pore-plate air supply port to each indoor position, and the accessibility of the heat source to each indoor position.

A calculation formula for the accessibility of the pore-plate air supply port to each indoor position is as follows:

$$a_{\theta,S}^{n_S,j} = \frac{\theta^j}{\theta_S^{n_S}} = \frac{T^j - T_0^j}{T_S^{n_S} - T_0^{n_S}}$$

$T_0^{n_S}$ is the preset initial temperature of the pore-plate air supply port, $T_0^{n_S}$ is the preset temperature of the pore-plate air supply port, $\theta_S^{n_S}$ is the air supply temperature-increasing value of the pore-plate air supply port, $\theta^j$ is the first temperature-increasing value of each indoor position, the first temperature-increasing value $\theta^j$ is equal to the current temperature $T^j$ of each indoor position minus the initial temperature $T_0^j$ of each indoor position, $\alpha_{\theta,S}^{n_S,j}$ is the accessibility of the air supply temperature of the pore-plate air supply port to each indoor position, and the accessibility represents a contribution degree of the pore-plate air supply port to an indoor temperature.

Specifically, after boundary conditions of the heat source and boundary conditions of air supply are considered through simulation, flow field simulation is carried out to establish a fixed flow field. In a process of establishing the fixed flow field, each pore-plate air supply port first carries out air supply at a certain preset initial temperature $T_0^{n_S}$, the heat source is not considered at this moment, the initial temperature $T_0^j$ of each indoor position is monitored, and then the air supply temperature of only one pore-plate air supply port is increased to the preset temperature $T_0^{n_S}$, the heat source is not considered, the current temperature $T^j$ of each indoor position is monitored, and the accessibility of the air supply temperature of the pore-plate air supply port to each indoor position is obtained by dividing the first temperature-increasing value of each indoor position by the air supply temperature-increasing value $\theta_S^{n_S}$, of the pore-plate air supply port.

Further, a calculation formula for the accessibility of heat source to each indoor position is as follows:

$$a_{\theta,H}^{n_H,j} = \frac{\theta^j}{\theta_E^{n_H}} = \frac{T^j - T_0^j}{\frac{q^{n_{Hq}}}{\rho C_p Q}}$$

$\theta^j$ is the second temperature-increasing value of each indoor position, the second temperature-increasing value $\theta^j$ is equal to the current temperature $T^j$ of each indoor position minus the initial temperature $T_0^j$ of each indoor position, $\theta_E^{n_H}$ is the average temperature-increasing value, $\rho$ is the air supply density, $q^{n_H}$ is the intensity of the $n_H$ heat source, $C_p$ is the specific heat capacity of the air, Q is the air supply volume of the pore-plate air supply port, $a_{\theta,H}^{n_H,j}$ is the accessibility of the heat source to each indoor position, and the accessibility represents a contribution degree of the heat source to an indoor temperature.

Specifically, when the accessibility of the heat source is determined, only one heat source is turned on, and each pore-plate air supply port carries out air supply at a certain preset initial temperature $T_0^{n_S}$, the second temperature-increasing value $\theta^j$ of each indoor position is monitored at this moment, and the accessibility of the heat source to each indoor position is obtained by dividing the second temperature-increasing value $\theta^j$ of each indoor position by the average temperature-increasing value $\theta_E^{n_H}$, caused by the heat source.

Therefore, in the pore-plate air supply mode, the air supply temperature of the pore-plate air supply port can be calculated according to the above formula, so that the pore-plate air supply port is controlled to carry out air supply on the basis of the air supply temperature.

In a specific application scenario, determining the target to be supplied with air is located at the set position according to the position information, and determining the ventilation demand information is the limited concentration of pollutants, then the target air supply mode is determined to be an air-curtain air supply mode or the pore-plate air supply mode, an air supply volume of the air-curtain air supply port or an air supply volume of the pore-plate air supply port is calculated according to the limited concentration of pollutants, and the air supply volume of the air-curtain air supply port or the air supply volume of the pore-plate air supply port is determined to be the target air supply parameter.

Figure 11B:
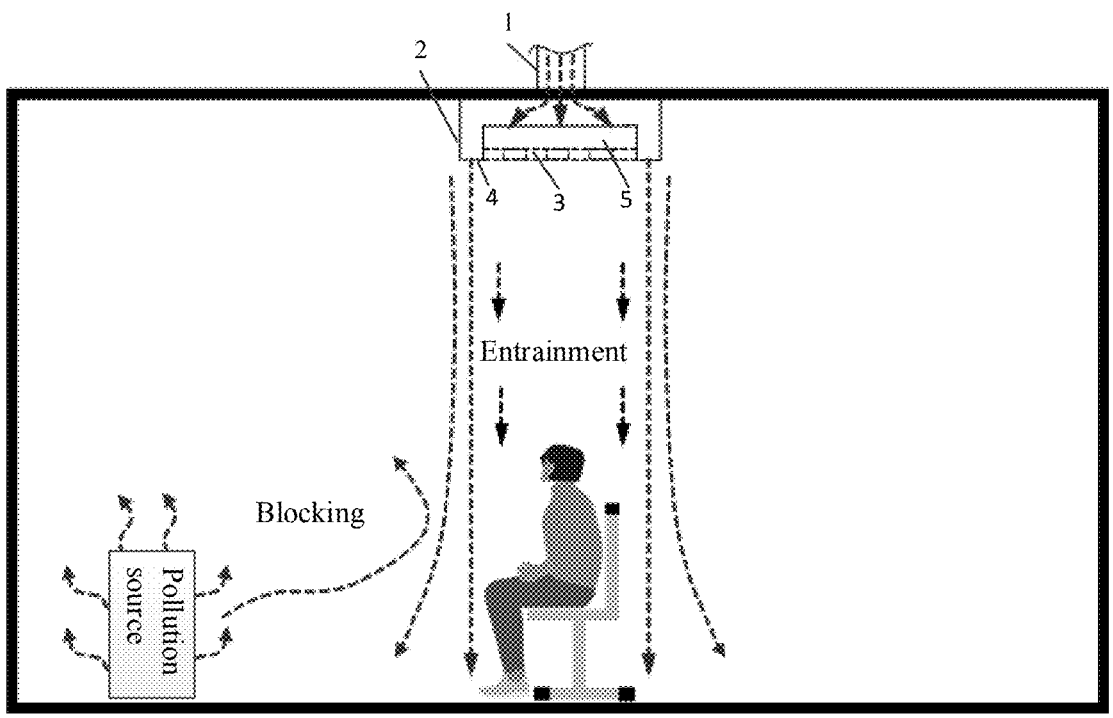

Specifically, as shown in FIG. 11B, in the presence of sudden pollutants indoors, then the target air supply mode is determined to be an air-curtain air supply mode, an air supply volume of the air-curtain air supply port is calculated according to the limited concentration of the pollutants, and the air supply volume of the air-curtain air supply port is determined to be the target air supply parameter.

The set position may be a workstation of the indoor person, and the limited concentration of pollutants is a pollutant concentration limit demand input by the target (indoor person) to be supplied with air. The air-curtain air supply mode is mainly used for blocking invasion of sudden pollutants or pathogens into the area of the person or preventing spread of the pathogens emitted by the person to other areas, and mainly aims at guaranteeing the health of the person. In addition, the area of the rectangle encircled by the four air-curtain air supply port around the pore-plate air supply port is greater than the projection dimension of the person on the ground, and the section of the air supply airflow may completely envelop the person to block a spread path between the person and the external pollutants.

Further, a specific calculation process for the air supply volume of the air-curtain air supply port includes: obtaining intensity of pollutants, and a concentration of the pollutants at the air-curtain air supply port; determining third accessibility of the air-curtain air supply port to the position of the target to be supplied with air, and fourth accessibility of the pollutants to the position of the target to be supplied with air; and calculating the air supply volume of the air-curtain air supply port according to the intensity of the pollutants, the concentration of the pollutants at the air-curtain air supply port, the limited concentration of the pollutants, the third accessibility, and the fourth accessibility.

It needs to be noted that, the determination process for the third accessibility and the fourth accessibility is similar to the above determination process for the first accessibility and the second accessibility, except that when the fixed flow field is established, each air-curtain air supply port carries out air supply at a certain initial air supply concentration, which will not be further elaborated here.

In addition, in a specific application scenario, if there is a sudden outbreak of toxic gases or pollutants, and the situation is relatively urgent, even if the user does not input the limited concentration of pollutants, according to the examples of the present invention, the air supply volume of the air-curtain air supply port may also be automatically calculated according to a default limited concentration of pollutants, and at this moment, if the indoor person cannot escape, the indoor person can quickly return to the own seat, and the air-curtain air supply port carries out air supply on the basis of the calculated air supply volume to block the toxic gases, so that the safety of the indoor person is guaranteed.

Therefore, in the air-curtain air supply mode, the air supply volume of the air-curtain air supply port can be calculated according to the above formula, so that the air-curtain air supply port is controlled to carry out air supply on the basis of the air supply volume.

Further, in the absence of sudden pollutants indoors, then the target air supply mode is determined to be the pore-plate air supply mode, an air supply volume of the pore-plate air supply port is calculated according to the limited concentration of pollutants, and the air supply volume of the pore-plate air supply port is determined to be the target air supply parameter.

It needs to be noted that, the pore-plate air supply mode may further guarantee daily ventilation and air exchange in the case of no sudden air pollution or pathogen release, and the air supply volume of the pore-plate air supply port may be determined according to the above calculation method for the air supply volume of the air-curtain air supply port, and will not be further elaborated here.

Figure 11C:
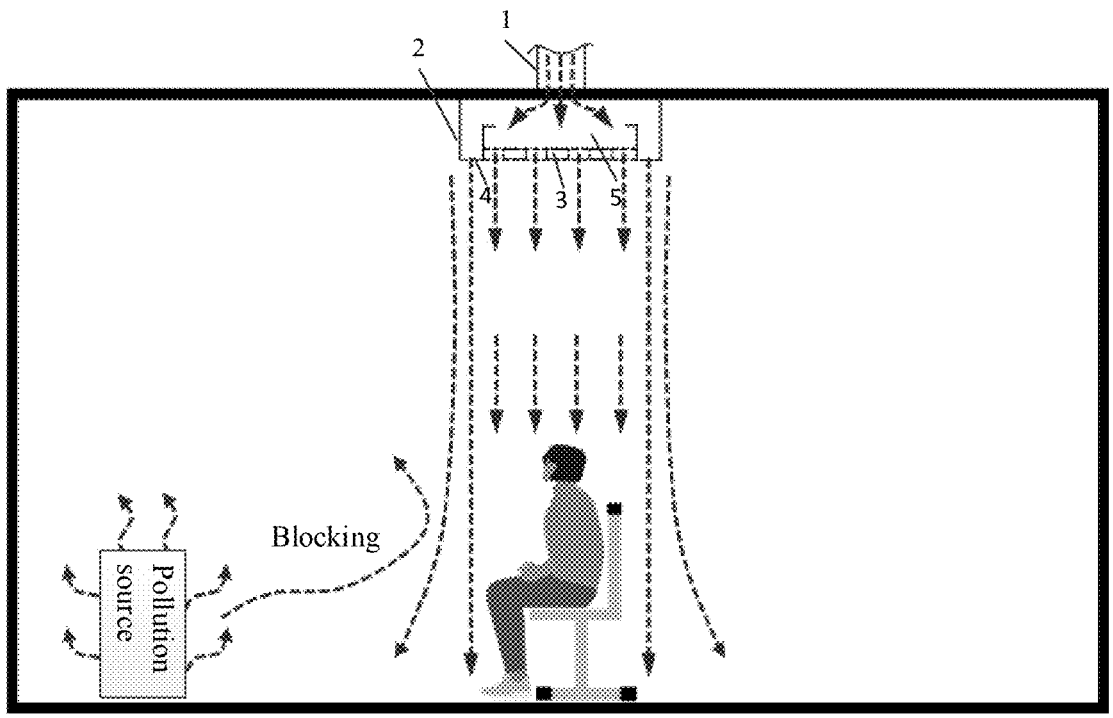

In a specific application scenario, as shown in FIG. 11C, determining the target to be supplied with air is located at the set position according to the position information, and determining the ventilation demand information is the set temperature and the limited concentration of pollutants, then the target air supply mode is determined to be an air curtain-pore plate combined air supply mode, an air supply volume of the air-curtain air supply port and an air supply temperature of the pore-plate air supply port are respectively calculated according to the limited concentration of pollutants and the set temperature, and the air supply volume of the air-curtain air supply port and the air supply temperature of the pore-plate air supply port are determined to be the target air supply parameters.

The air curtain-pore plate combined air supply mode mainly aims at guaranteeing the thermal preference and the health of the person simultaneously, and a calculation manner for the air supply volume of the air-curtain air supply port and a calculation manner for the air supply temperature of the pore-plate air supply port are the same as the calculation manner for the air supply volume in the air-curtain air supply mode and the calculation manner for the air supply temperature in the pore-plate air supply mode, and will not be further elaborated here.

In a specific application scenario, determining the target to be supplied with air is not located at the set position according to the position information, then the target air supply mode is determined to be a directional air supply mode or a mixed air supply mode, and the target air supply parameter is an air supply angle calculated in real time or a basic air supply angle.

Figure 11D:
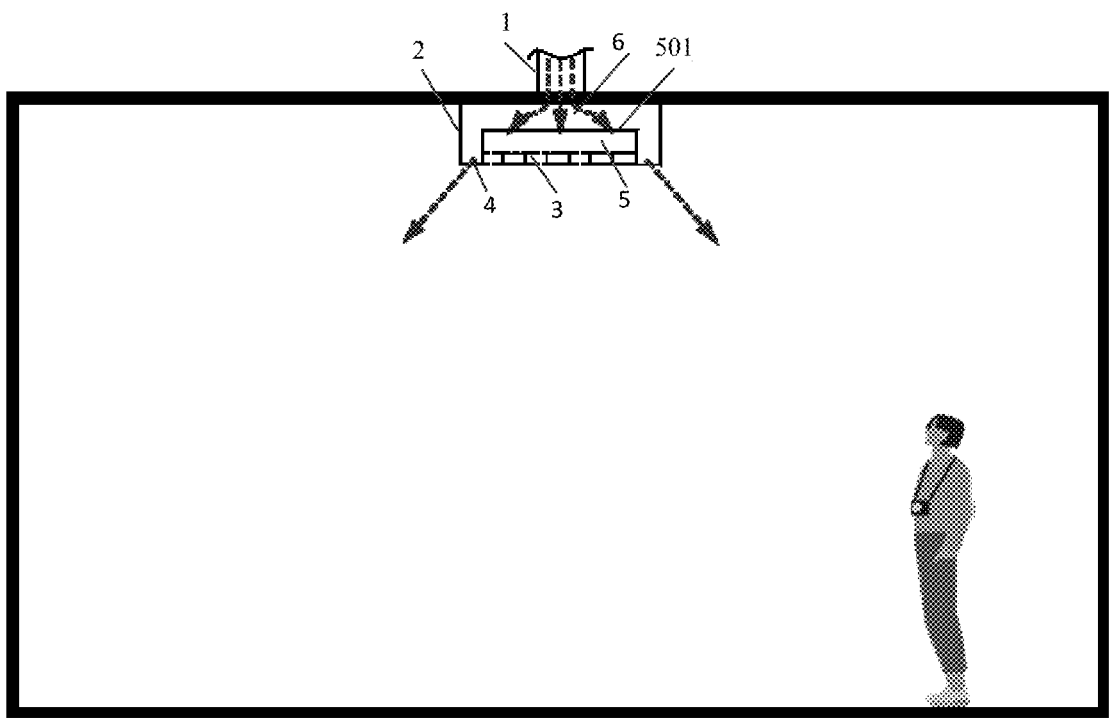

Specifically, as shown in FIG. 11D, determining the target to be supplied with air is not located at the set position according to the position information, and has a mixed ventilation requirement, then the target air supply mode is determined to be a mixed air supply mode, and the target air supply parameter is determined to be a basic air supply angle.

The set position may be a workstation of the target (indoor person) to be supplied with air, the basic air supply angle β0 is determined in a manner of traditional airflow organization design, the mixed air supply mode aims at guaranteeing a uniform indoor environment, and the main principle is closing the pore-plate air supply port, and adjusting the air supply angle of the air-curtain air supply port to the basic air supply angle β0 that can enable full attenuation of a jet flow to be appropriate, so that the uniform indoor thermal environment is guaranteed.

Figure 11E:
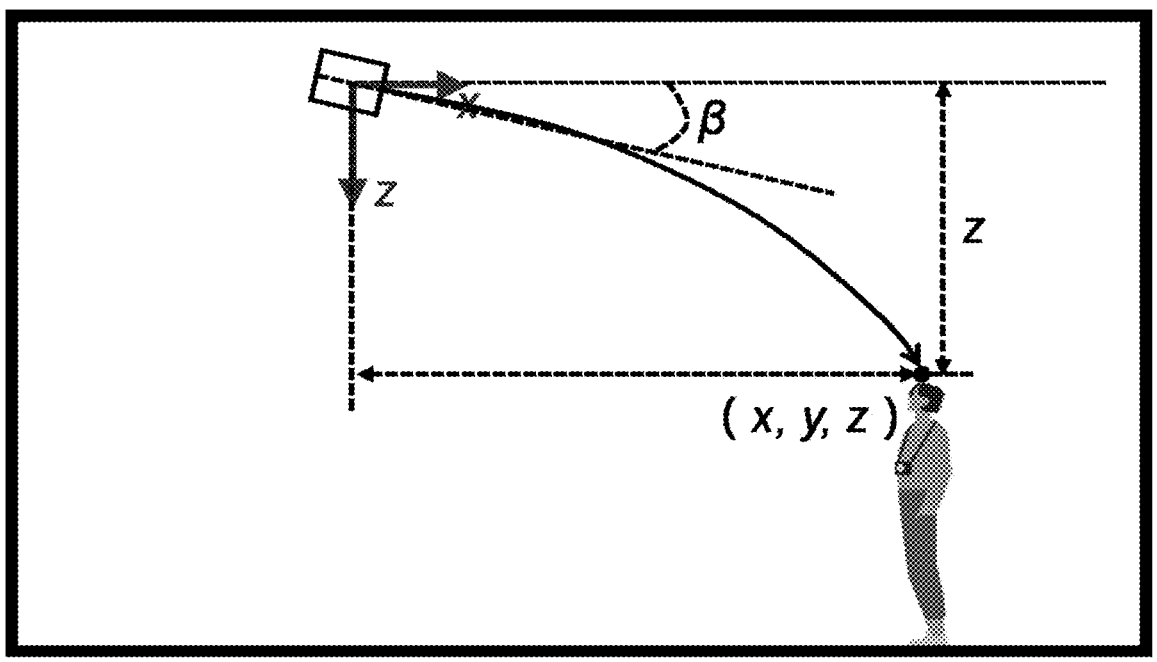

Further, as shown in FIG. 11E, determining the target to be supplied with air is not located at the set position according to the position information, and does not have a mixed ventilation requirement, then the target air supply mode is determined to be a directional air supply mode, an air supply angle of the air-curtain air supply port is calculated in real time according to the position information, and the calculated air supply angle is determined to be the target air supply parameter.

Specifically, when the target (indoor person) to be supplied with air is not at the workstation and has no special requirement, the directional air supply mode is preferred, that is, directional air supply when the person is not at the workstation is realized through tracking the position of the person, and the principle is: taking the air supply terminal as a coordinate origin, when it is monitored that the indoor person is not at the workstation, the sensor locates the position coordinates (x, y, z) of the head of the person, and calculates the air supply angle of the air-curtain air supply port in real time on the basis of a vertical distance z between the head of the person and the air-curtain air supply port, and a horizontal distance x between the head of the person and the air-curtain air supply port.

On the basis of this, the method includes: determining a vertical distance and a horizontal distance between the head of the target to be supplied with air and the air-curtain air supply port according to the position information; calculating an equivalent diameter of the air-curtain air supply port; and calculating an air supply angle of the air-curtain air supply port in real time according to the vertical distance, the horizontal distance, and the equivalent diameter. A specific calculation formula for the air supply angle β of the air-curtain air supply port is as follows:

$$\frac{z}{d} = \frac{x}{d}\tan\beta + \frac{gd(T_s - T_j)}{V_s^2(T_j + 273.15)}\left(\frac{x}{d\cos\beta}\right)^2\left(0.51\frac{ax}{d\cos\beta} + 0.35\right)$$

where z is the vertical distance between the head of the indoor person and the air-curtain air supply port, $T_s$ is the air supply temperature of the air-curtain air supply port, $T_j$ is a temperature near the indoor person, $V_s$ is an air supply speed of the air-curtain air supply port, $T_s$, $T_j$, and $V_s$ may be detected through sensors, g is the gravity acceleration, x is the horizontal distance between the head of the indoor person and the air-curtain air supply port, a is a turbulence coefficient, d is the equivalent diameter of the air-curtain air supply port, $d=1.13\sqrt{ab}$, and a and b are length information and width information of a rectangle corresponding to the air-curtain air supply port.

Therefore, in the directional air supply mode, the air supply angle of the air-curtain air supply port can be calculated according to the above formula, so that the air-curtain air supply port is controlled to carry out air supply on the basis of the air supply angle.

Step 104, controlling the air supply terminal to carry out air supply on the basis of the target air supply mode and the target air supply parameter.

Figure 12:
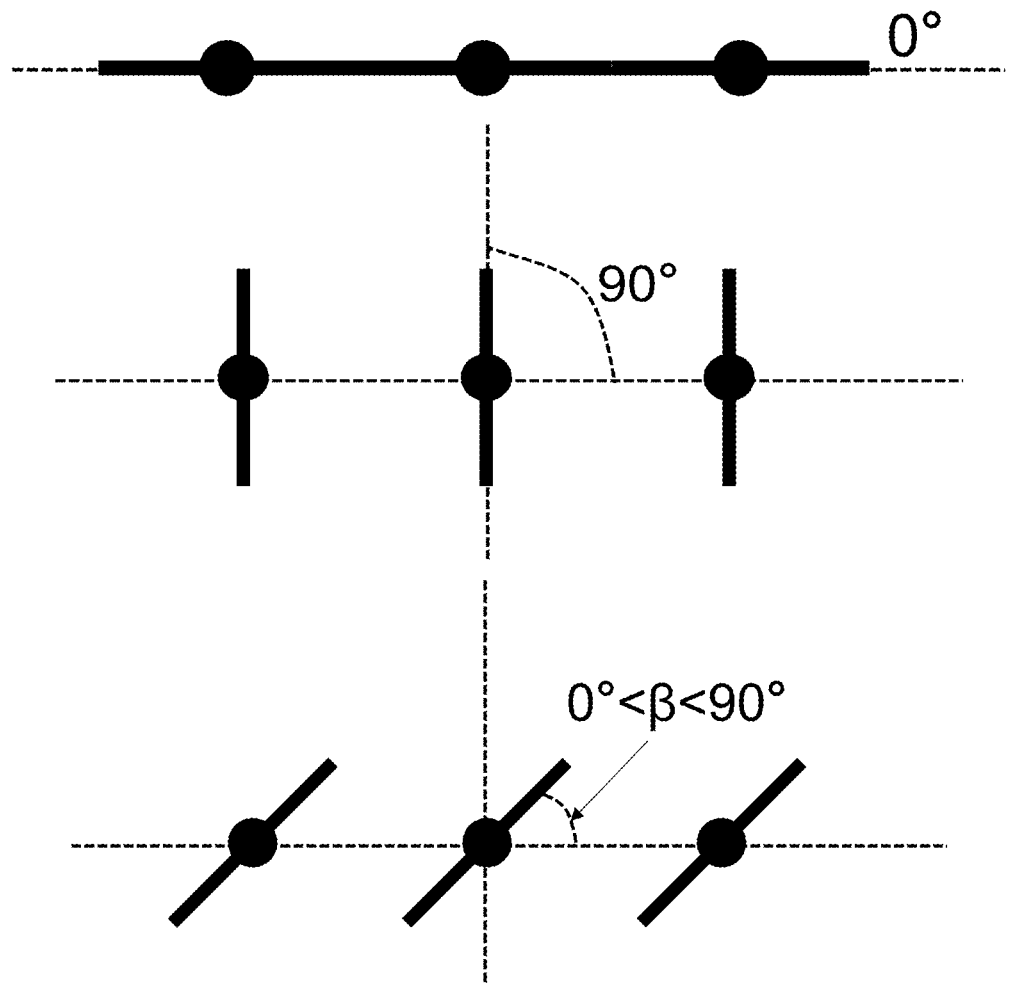
FIG. 12 is a schematic diagram of angle adjustment provided by the examples of the present invention.

The pore-plate air valve shutters of the pore-plate air supply port and the air curtain shutters of the air-curtain air supply port in the air supply terminal may be randomly adjusted in a range of 0 degree to 90 degrees, and as shown in FIG. 12, the pore-plate air valve shutters and the air curtain shutters are in a closed state while being adjusted to 0 degree, that is, the pore-plate air supply port and the air-curtain air supply port are closed.

In a specific application scenario, when the target air supply mode is the pore-plate air supply mode, and the target air supply parameter is the air supply temperature of the pore-plate air supply port, an adjustment motor for the air-curtain air supply port is controlled to adjust the air curtain shutters to a first preset angle, an adjustment motor for the pore-plate air supply port is controlled to adjust the angles of the pore-plate air valve shutters to a second preset angle, and the pore-plate air supply port is controlled to carry out air supply according to the air supply temperature of the pore-plate air supply port. The first preset angle may be 0 degree, and the second preset angle may be 90 degrees.

Figure 13A:
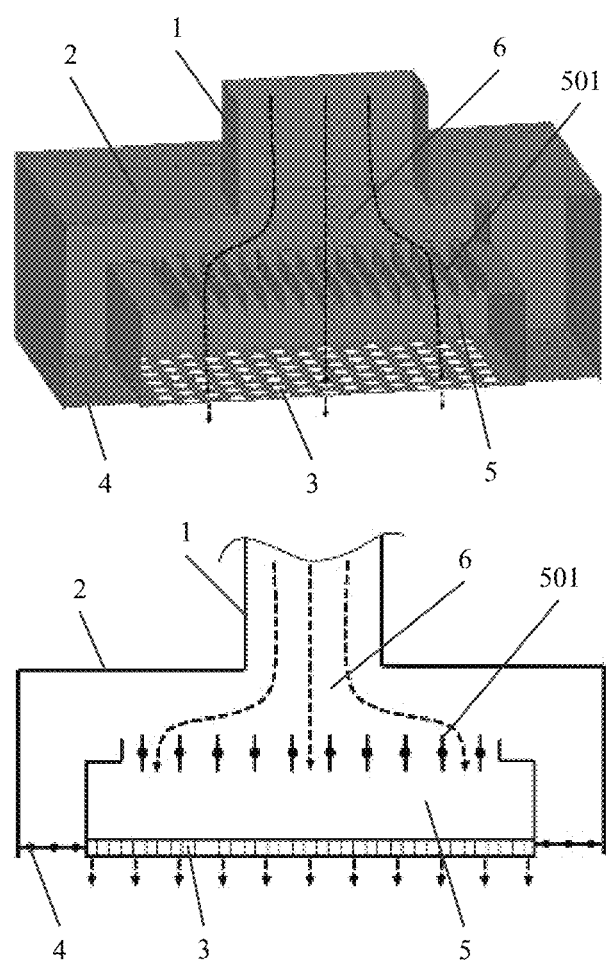

Specifically, in the pore-plate air supply mode, as shown in FIG. 13A, the adjustment motor for the air curtain shutters adjusts the air curtain shutters to 0 degree, the motor for the pore-plate air valve adjusts the pore-plate air valve shutters to 90 degrees, and the pore-plate air supply port carries out air supply on the basis of the determined air supply temperature.

Further, when the target air supply mode is the air-curtain air supply mode, and the target air supply parameter is the air supply volume of the air-curtain air supply port, the adjustment motor for the pore-plate air supply port is controlled to adjust the angles of the pore-plate air valve shutters to a first preset angle, the adjustment motor for the air-curtain air supply port is controlled to adjust the air curtain shutters to a second preset angle, and the air-curtain air supply port is controlled to carry out air supply according to the air supply volume of the air-curtain air supply port. The first preset angle may be 0 degree, and the second preset angle may be 90 degrees.

Figure 13B:
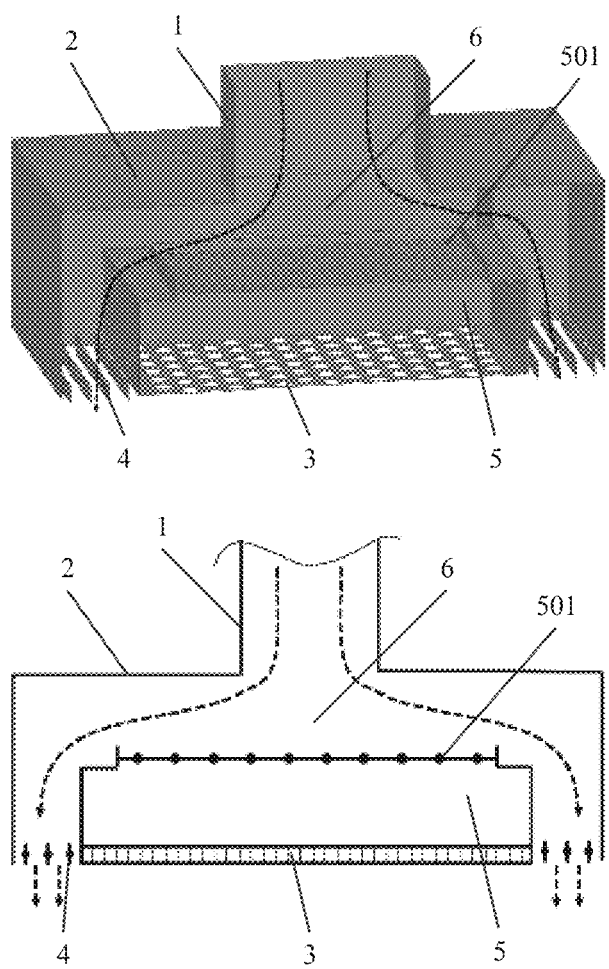

Specifically, in the air-curtain air supply mode, as shown in FIG. 13B, the adjustment motor for the air curtain shutters adjusts the air curtain shutters to 90 degrees, the motor for the pore-plate air valve adjusts the pore-plate air valve shutters to 0 degree, and the air-curtain air supply port carries out air supply on the basis of the determined air supply volume.

Further, when the target air supply mode is the pore-plate air supply mode, and the target air supply parameter is the air supply volume of the pore-plate air supply port, the adjustment motor for the air-curtain air supply port is controlled to adjust the air curtain shutters to a first preset angle, an adjustment motor for the pore-plate air supply port is controlled to adjust the angles of the pore-plate air valve shutters to a second preset angle, and the pore-plate air supply port is controlled to carry out air supply according to the air supply volume of the pore-plate air supply port. The first preset angle may be 0 degree, and the second preset angle may be 90 degrees.

Specifically, in the pore-plate air supply mode, the adjustment motor for the air curtain shutters adjusts the air curtain shutters to 0 degree, the motor for the pore-plate air valve adjusts the pore-plate air valve shutters to 90 degrees, and the pore-plate air supply port carries out air supply on the basis of the determined air supply volume.

Further, when the target air supply mode is the air curtain-pore plate combined air supply mode, and the target air supply parameters are the air supply volume of the air-curtain air supply port and the air supply temperature of the pore-plate air supply port, the adjustment motor for the air-curtain air supply port and the adjustment motor for the pore-plate air supply port are respectively controlled to adjust the air curtain shutters and the angles of the pore-plate air valve shutters to a second preset angle, and the air-curtain air supply port and the pore-plate air supply port are controlled to carry out air supply according to the air supply volume of the air-curtain air supply port and the air supply temperature of the pore-plate air supply port. The second preset angle may be 90 degrees.

Figure 13C:
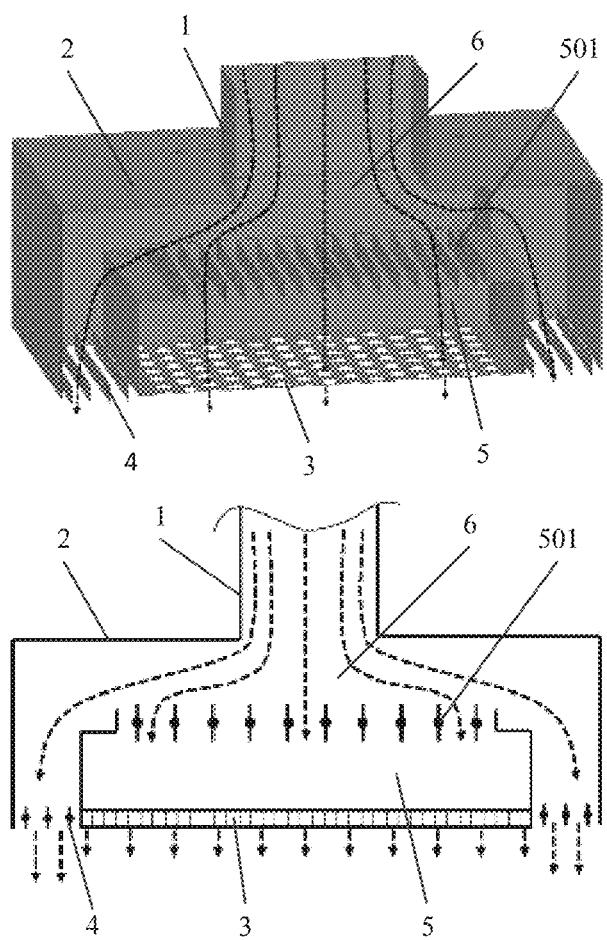

Specifically, in the air curtain-pore plate combined air supply mode, as shown in FIG. 13C, the adjustment motor for the air curtain shutters adjusts the air curtain shutters to 90 degrees, the motor for the pore-plate air valve adjusts the pore-plate air valve shutters to 90 degrees, the pore-plate air supply port carries out air supply on the basis of the determined air supply temperature, and the air-curtain air supply port carries out air supply on the basis of the determined air supply volume.

Further, when the target air supply mode is the mixed air supply mode, and the target air supply parameter is the basic air supply angle, the adjustment motor for the pore-plate air supply port is controlled to adjust the angles of the pore-plate air valve shutters to a first preset angle, and the adjustment motor for the air-curtain air supply port is controlled to adjust the air curtain shutters to the basic air supply angle. The first preset angle may be 0 degree, and the basic air supply angle is a fixed angle $\beta 0$, and is calculated on the basis of a principle of traditional airflow organization design.

Figure 13D:
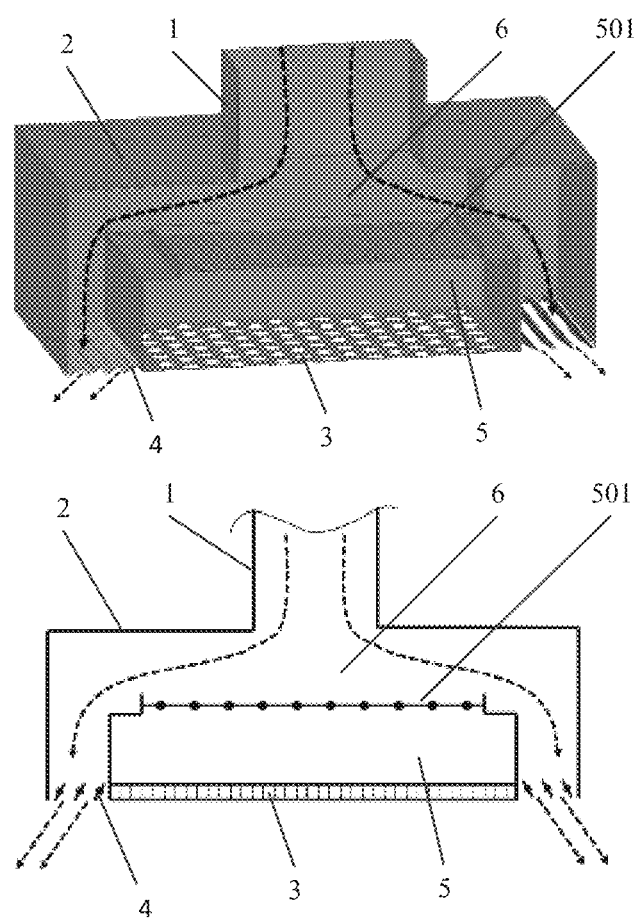

Specifically, in the mixed air supply mode, as shown in FIG. 13D, the motor for the pore-plate air valve adjusts the pore-plate air valve shutters to 0 degree, and the adjustment motor for the air curtain shutters adjusts the air curtain shutters to the basic air supply angle $\beta 0$ to carry out air supply.

Further, when the target air supply mode is the directional air supply mode, and the target air supply parameter is the air supply angle calculated in real time, the adjustment motor for the pore-plate air supply port is controlled to adjust the angles of the pore-plate air valve shutters to a first preset angle, and the adjustment motor for the air-curtain air supply port is controlled to adjust the air curtain shutters to the air supply angle calculated in real time. The first preset angle may be 0 degree.

Specifically, in the directional air supply mode, the motor for the pore-plate air valve adjusts the pore-plate air valve shutters to 0 degree, and the adjustment motor for the air curtain shutters adjusts the air curtain shutters to the air supply angle R calculated in real time to carry out air supply.

According to the multi-mode air supply method, which is provided by the present invention, through controlling opening/closing of the pore-plate air supply port and the air-curtain air supply port in the air supply terminal, flexibly switching can be carried out among the plurality of air supply modes, so that functions of thermal comfort guarantee, pollutant blocking, ventilation and air exchange, etc. can be realized, that is, according to the examples of the present invention, not only can the personalized thermal preference of the indoor person be dynamically guaranteed, but cross contamination of toxic and harmful substances can also be prevented, and the freshness degree of the air in the breathing area of the person can also be guaranteed.

Figure 14:
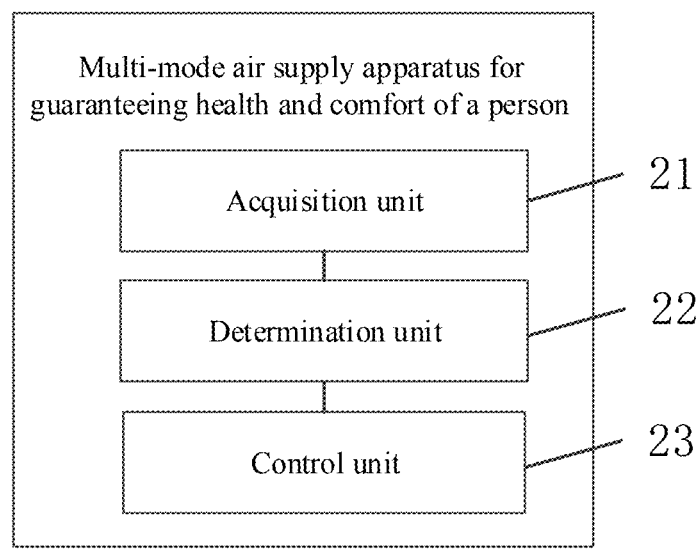
FIG. 14 is a structural schematic diagram of a multi-mode air supply apparatus, which is provided by the examples of the present invention.

Further, as a specific realization of FIG. 10, the examples of the present invention provide a multi-mode air supply apparatus, and as shown in FIG. 14, the apparatus includes: an acquisition unit 21, a determination unit 22 and a control unit 23.

The acquisition unit 21 may be used for acquiring position information of a target to be supplied with air, and ventilation demand information, where the ventilation demand information includes a set temperature and/or a limited concentration of pollutants.

The determination unit 22 may be used for determining an air supply terminal closest to the target to be supplied with air according to the position information of the target to be supplied with air, where the air supply terminal is provided with a plurality of air supply modes; and the determination unit is further used for determining a target air supply mode and a target air supply parameter corresponding to the air supply terminal according to the position information of the target to be supplied with air, and the ventilation demand information.

The control unit 23 may be used for controlling the air supply terminal to carry out air supply on the basis of the target air supply mode and the target air supply parameter.

In a specific application scenario, the determination unit 22 includes a first determination module, a second determination module, a third determination module, and a fourth determination module.

The first determination module may be used for, determining the target to be supplied with air is located at a set position according to the position information, and determining the ventilation demand information is the set temperature, then determining the target air supply mode to be a pore-plate air supply mode, calculating an air supply temperature of the pore-plate air supply port according to the set temperature, and determining the air supply temperature of the pore-plate air supply port to be the target air supply parameter.

The second determination module may be used for, determining the target to be supplied with air is located at the set position according to the position information, and determining the ventilation demand information is the limited concentration of pollutants, then determining the target air supply mode to be an air-curtain air supply mode or the pore-plate air supply mode, calculating an air supply volume of the air-curtain air supply port or an air supply volume of the pore-plate air supply port according to the limited concentration of pollutants, and determining the air supply volume of the air-curtain air supply port or the air supply volume of the pore-plate air supply port to be the target air supply parameter.

The third determination module may be used for, determining the target to be supplied with air is located at the set position according to the position information, and determining the ventilation demand information is the set temperature and the limited concentration of pollutants, then determining the target air supply mode to be an air curtain-pore plate combined air supply mode, respectively calculating an air supply volume of the air-curtain air supply port and an air supply temperature of the pore-plate air supply port according to the limited concentration of pollutants and the set temperature, and determining the air supply volume of the air-curtain air supply port and the air supply temperature of the pore-plate air supply port to be the target air supply parameters.

The fourth determination module may be used for, determining the target to be supplied with air is not located at the set position according to the position information, then determining the target air supply mode to be a directional air supply mode or a mixed air supply mode, and determining the target air supply parameter to be an air supply angle calculated in real time or a basic air supply angle.

In a specific application scenario, the first determination module may be specifically used for obtaining an initial environment temperature, an air supply density, intensity of a heat source, specific heat capacity of air, and an air supply volume of the pore-plate air supply port; determining first accessibility of the pore-plate air supply port to a position of the target to be supplied with air, and second accessibility of the heat source to the position of the target to be supplied with air; and calculating an air supply temperature of the pore-plate air supply port according to the set temperature, the initial environment temperature, the air supply density, the intensity of the heat source, the specific heat capacity of air, the air supply volume of the pore-plate air supply port, the first accessibility, and the second accessibility.

Further, the first determination module may further be specifically used for, when the air supply temperature of the pore-plate air supply port increases from a preset initial temperature to a preset temperature, calculating a first temperature-increasing value of each indoor position; subtracting the preset initial temperature from the preset temperature to obtain an air supply temperature-increasing value of the pore-plate air supply port; dividing the first temperature-increasing value of each indoor position by the air supply temperature-increasing value to obtain accessibility of the pore-plate air supply port to each indoor position; when the heat source is turned on, calculating a second temperature-increasing value of each indoor position, and determining an average temperature-increasing value of indoor temperature increasing caused by the heat source; dividing the second temperature-increasing value of each indoor position by the average temperature-increasing value to obtain accessibility of the heat source to each indoor position; and respectively determining first accessibility of the pore-plate air supply port to the position of the target to be supplied with air, and second accessibility of the heat source to the position of the target to be supplied with air according to the position information of the target to be supplied with air, the accessibility of the pore-plate air supply port to each indoor position, and the accessibility of the heat source to each indoor position.

Further, the second determination module includes: a first determination sub-module and a second determination sub-module.

The first determination sub-module may be used for, in the presence of sudden pollutants indoors, then determining the target air supply mode to be an air-curtain air supply mode, calculating an air supply volume of the air-curtain air supply port according to the limited concentration of the pollutants, and determining the air supply volume of the air-curtain air supply port to be the target air supply parameter.

The second determination sub-module may be used for, in the absence of sudden pollutants indoors, then determining the target air supply mode to be a pore-plate air supply mode, calculating an air supply volume of the pore-plate air supply port according to the limited concentration of the pollutants, and determining the air supply volume of the pore-plate air supply port to be the target air supply parameter.

Further, the first determination sub-module may be specifically used for obtaining an air supply density, intensity of pollutants, specific heat capacity of air, and a concentration of the pollutants at the air-curtain air supply port; determining third accessibility of the air-curtain air supply port to the position of the target to be supplied with air, and fourth accessibility of the pollutants to the position of the target to be supplied with air; and calculating the air supply volume of the air-curtain air supply port according to the air supply density, the intensity of the pollutants, the specific heat capacity of air, the concentration of the pollutants, the limited concentration of the pollutants, the third accessibility, and the fourth accessibility.

Further, the fourth determination module includes: a third determination sub-module and a fourth determination sub-module.

The third determination sub-module may be used for, determining the target to be supplied with air is not located at the set position according to the position information, and does not have a mixed ventilation requirement, then determining the target air supply mode to be a directional air supply mode, calculating an air supply angle of the air-curtain air supply port in real time according to the position information, and determining the calculated air supply angle to be the target air supply parameter.

The fourth determination sub-module may be used for, determining the target to be supplied with air is not located at the set position according to the position information, and has a mixed ventilation requirement, then determining the target air supply mode to be a mixed air supply mode, and determining the target air supply parameter to be a basic air supply angle.

Further, the third determination sub-module may be specifically used for determining a vertical distance and a horizontal distance between the head of the target to be supplied with air and the air-curtain air supply port according to the position information; calculating an equivalent diameter of the air-curtain air supply port; and calculating an air supply angle of the air-curtain air supply port in real time according to the vertical distance, the horizontal distance, and the equivalent diameter.

In a specific application scenario, the control unit 23 may be specifically used for, when the target air supply mode is the pore-plate air supply mode, and the target air supply parameter is the air supply temperature of the pore-plate air supply port, controlling an adjustment motor for the air-curtain air supply port to adjust air curtain shutters to a first preset angle, controlling an adjustment motor for the pore-plate air supply port to adjust angles of pore-plate air valve shutters to a second preset angle, and controlling the pore-plate air supply port to carry out air supply according to the air supply temperature of the pore-plate air supply port; when the target air supply mode is the air-curtain air supply mode, and the target air supply parameter is the air supply volume of the air-curtain air supply port, controlling the adjustment motor for the pore-plate air supply port to adjust the angles of the pore-plate air valve shutters to a first preset angle, controlling the adjustment motor for the air-curtain air supply port to adjust the air curtain shutters to a second preset angle, and controlling the air-curtain air supply port to carry out air supply according to the air supply volume of the air-curtain air supply port; when the target air supply mode is the pore-plate air supply mode, and the target air supply parameter is the air supply volume of the pore-plate air supply port, controlling the adjustment motor for the air-curtain air supply port to adjust the air curtain shutters to a first preset angle, controlling the adjustment motor for the pore-plate air supply port to adjust the angles of the pore-plate air valve shutters to a second preset angle, and controlling the pore-plate air supply port to carry out air supply according to the air supply volume of the pore-plate air supply port; when the target air supply mode is the air curtain-pore plate combined air supply mode, and the target air supply parameters are the air supply volume of the air-curtain air supply port and the air supply temperature of the pore-plate air supply port, respectively controlling the adjustment motor for the air-curtain air supply port and the adjustment motor for the pore-plate air supply port to adjust the air curtain shutters and the angles of the pore-plate air valve shutters to a second preset angle, and controlling the air-curtain air supply port and the pore-plate air supply port to carry out air supply according to the air supply volume of the air-curtain air supply port and the air supply temperature of the pore-plate air supply port; when the target air supply mode is the mixed air supply mode, and the target air supply parameter is the basic air supply angle, controlling the adjustment motor for the pore-plate air supply port to adjust the angles of the pore-plate air valve shutters to a first preset angle, and controlling the adjustment motor for the air-curtain air supply port to adjust the air curtain shutters to the basic air supply angle; and when the target air supply mode is the directional air supply mode, and the target air supply parameter is the air supply angle calculated in real time, controlling the adjustment motor for the pore-plate air supply port to adjust the angles of the pore-plate air valve shutters to a first preset angle, and controlling the adjustment motor for the air-curtain air supply port to adjust the air curtain shutters to the air supply angle calculated in real time.

It needs to be noted that, the other corresponding descriptions for various functional modules involved in the multi-mode air supply apparatus, which is provided by the examples of the present invention, may refer to the corresponding descriptions for the method shown in FIG. 10, and will not be further elaborated here.

On the basis of the above method shown in FIG. 10, correspondingly, the examples of the present invention further provide a computer-readable storage medium in which a computer program is stored, and the following steps are realized when the program is executed by a processor: acquiring position information of a target to be supplied with air, and ventilation demand information, where the ventilation demand information includes a set temperature and/or a limited concentration of pollutants; determining an air supply terminal closest to the target to be supplied with air according to the position information of the target to be supplied with air, where the air supply terminal is provided with a plurality of air supply modes; determining a target air supply mode and a target air supply parameter corresponding to the air supply terminal according to the position information of the target to be supplied with air, and the ventilation demand information; and controlling the air supply terminal to carry out air supply on the basis of the target air supply mode and the target air supply parameter.

Figure 15:
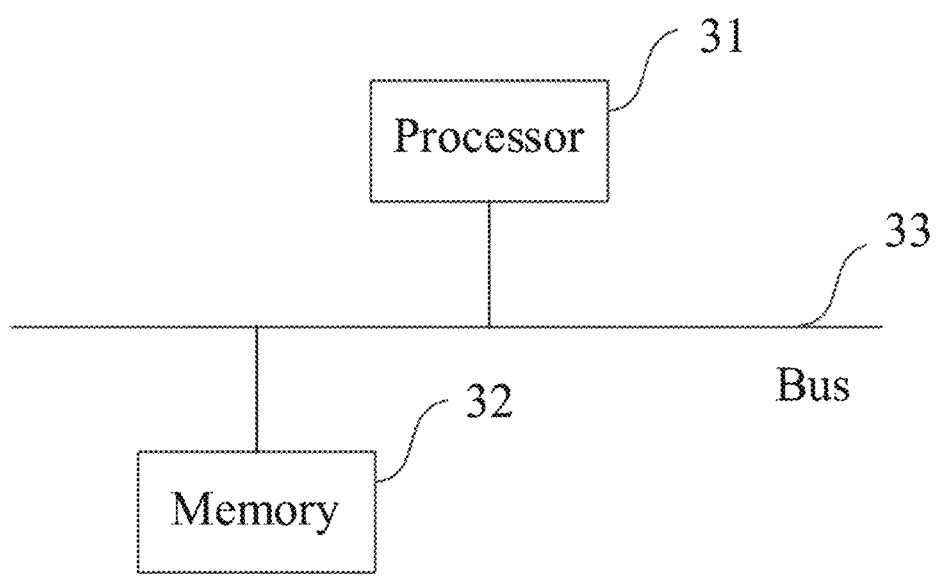
FIG. 15 is a schematic diagram of a physical structure of an electronic device provided by the examples of the present invention.

On the basis of the above examples of the method shown in FIG. 10 and the apparatus shown in FIG. 14, the examples of the present invention further provide a physical structure diagram of an electronic device, and as shown in FIG. 15, the electronic device includes: a processor 31, a memory 32, and a computer program stored in the memory 32 and capable of running in the processor, where both the memory 32 and the processor 31 are arranged on a bus 33, and the following steps are realized when the program is executed by the processor 31: acquiring position information of a target to be supplied with air, and ventilation demand information, where the ventilation demand information includes a set temperature and/or a limited concentration of pollutants; determining an air supply terminal closest to the target to be supplied with air according to the position information of the target to be supplied with air, where the air supply terminal is provided with a plurality of air supply modes; determining a target air supply mode and a target air supply parameter corresponding to the air supply terminal according to the position information of the target to be supplied with air, and the ventilation demand information;

and controlling the air supply terminal to carry out air supply on the basis of the target air supply mode and the target air supply parameter.

According to the examples of the present invention, through controlling opening/closing of the pore-plate air supply port and the air-curtain air supply port in the air supply terminal, flexibly switching can be carried out among the plurality of air supply modes, so that functions of thermal comfort guarantee, pollutant blocking, ventilation and air exchange, etc. can be realized, that is, the air supply terminal designed by the present invention can not only dynamically guarantee the personalized thermal preference of the indoor person, but also prevent cross contamination of toxic and harmful substances, and guarantee the freshness degree of the air in the breathing area of the person.

Those of ordinary skills in the art may understand that: the drawings are merely schematic diagrams of an example, and the modules or flows in the drawings are not necessary for implementing the present invention.

Those of ordinary skills in the art may understand that: the modules in the apparatuses in the examples may be distributed in the apparatuses of the examples according to the descriptions for the examples, or may be correspondingly changed to be located in one or more apparatuses which are different from the examples. The modules in the above examples may be combined into one module, or may be further divided into a plurality of sub-modules.

Finally, it should be noted that: the above examples are merely used for illustrating the technical solutions of the present invention, but not limit them; although the present invention has been described in detail with reference to the foregoing examples, those of ordinary skills in the art should understand that: the technical solutions recorded in the foregoing examples may still be modified, or some of the technical features therein may be equivalently substituted; however, these modifications or substitutions do not separate the essence of the corresponding technical solutions from the spirit and scope of the technical solutions of the examples of the present invention.

What is claimed is:

1. A multi-mode air supply method, comprising:
acquiring position information of a target to be supplied with air, and ventilation demand information, wherein the ventilation demand information comprises a set temperature and/or a limited concentration of pollutants;
determining an air supply terminal closest to the target to be supplied with air according to the position information of the target to be supplied with air, wherein the air supply terminal is provided with a plurality of air supply modes;
determining a target air supply mode and a target air supply parameter corresponding to the air supply terminal according to the position information of the target to be supplied with air, and the ventilation demand information; and
controlling the air supply terminal to carry out air supply on the basis of the target air supply mode and the target air supply parameter;
wherein the determining a target air supply mode and a target air supply parameter corresponding to the air supply terminal according to the position information of the target to be supplied with air, and the ventilation demand information comprises:
determining the target to be supplied with air is located at a set position according to the position information, and determining the ventilation demand information is the set temperature, then determining the target air supply mode to be a pore-plate air supply mode, calculating an air supply temperature of the pore-plate air supply port according to the set temperature, and determining the air supply temperature of the pore-plate air supply port to be the target air supply parameter;
determining the target to be supplied with air is located at the set position according to the position information, and determining the ventilation demand information is the limited concentration of pollutants, then determining the target air supply mode to be an air-curtain air supply mode or the pore-plate air supply mode, calculating an air supply volume of the air-curtain air supply port or an air supply volume of the pore-plate air supply port according to the limited concentration of pollutants, and determining the air supply volume of the air-curtain air supply port or the air supply volume of the pore-plate air supply port to be the target air supply parameter;
determining the target to be supplied with air is located at the set position according to the position information, and determining the ventilation demand information is the set temperature and the limited concentration of pollutants, then determining the target air supply mode to be an air curtain-pore plate combined air supply mode, respectively calculating an air supply volume of the air-curtain air supply port and an air supply temperature of the pore-plate air supply port according to the limited concentration of pollutants and the set temperature, and determining the air supply volume of the air-curtain air supply port and the air supply temperature of the pore-plate air supply port to be the target air supply parameters; and
determining the target to be supplied with air is not located at the set position according to the position information, then determining the target air supply mode to be a directional air supply mode or a mixed air supply mode, and determining the target air supply parameter to be an air supply angle calculated in real time or a basic air supply angle;
wherein the calculating the air supply temperature of the pore-plate air supply port according to the set temperature comprises:
obtaining an initial environment temperature, an air supply density, intensity of a heat source, specific heat capacity of air, and an air supply volume of the pore-plate air supply port;
determining first accessibility of the pore-plate air supply port to a position of the target to be supplied with air, and second accessibility of the heat source to the position of the target to be supplied with air; and
calculating an air supply temperature of the pore-plate air supply port according to the set temperature, the initial environment temperature, the air supply density, the intensity of the heat source, the specific heat capacity of air, the air supply volume of the pore-plate air supply port, the first accessibility, and the second accessibility, and a calculation formula for the temperature difference of the pore-plate air supply port is as follows:

$$\theta_{set}^{Target,j} = \sum_{n_S=1}^{N_S}\left[\theta_S^{n_S} a_{\theta,S}^{n_S,Target,j}\right] + \sum_{n_H=1}^{N_H}\left[\frac{q^{n_H}}{\rho C_p Q} a_{\theta,H}^{n_H,Target,j}\right]$$

wherein $\theta_{set}^{Target,j}$ is a preferred temperature difference of the target j to be supplied with air, the preferred temperature difference $\theta_{set}^{Target,j}$ is obtained by subtracting the set temperature from the known initial environment temperature, $\theta_S^{ns}$ is temperature difference of the pore-plate air supply port, and the air supply temperature of the pore-plate air supply port is obtained by adding the obtained temperature difference $\theta_S^{ns}$ of the pore-plate air supply port to the initial air supply temperature of the pore-plate air supply port; $a_{\theta,S}^{ns,Target,j}$ is the first accessibility of the $n_s$th pore-plate air supply port to the position of the target to be supplied with air; $\rho$ is the air supply density, $q^{nH}$ is the intensity of the $n_H$th heat source, $C_p$ is the specific heat capacity of air, Q is the air supply volume of the pore-plate air supply port, and specifically, the air supply volume of the pore-plate air supply port is detected through a sensor; and $a_{\theta,H}^{nH,Target,j}$ is the second accessibility of the $n_H$th heat source to the position of the target to be supplied with air;

wherein the determining the target air supply mode to be a directional air supply mode or a mixed air supply mode, and determining the target air supply parameter to be the air supply angle calculated in real time or the basic air supply angle comprises:

determining the target to be supplied with air is not located at the set position according to the position information, and does not have a mixed ventilation requirement, then determining the target air supply mode to be a directional air supply mode, calculating the air supply angle of the air-curtain air supply port in real time according to the position information, and determining the calculated air supply angle to be the target air supply parameter;

wherein the calculating the air supply angle of the air-curtain air supply port in real time according to the position information comprises:

determining a vertical distance and a horizontal distance between the head of the target to be supplied with air and the air-curtain air supply port according to the position information;

calculating an equivalent diameter of the air-curtain air supply port; and calculating the air supply angle of the air-curtain air supply port in real time according to the vertical distance, the horizontal distance, and the equivalent diameter, and a calculation formula is as follows:

$$\frac{z}{d} = \frac{x}{d}\tan\beta + \frac{gd(T_s - T_j)}{V_s^2(T_j + 273.15)}\left(\frac{x}{d\cos\beta}\right)^2\left(0.51\frac{ax}{d\cos\beta} + 0.35\right)$$

wherein $\beta$ is the air supply angle, z is the vertical distance between the head of the indoor person and the air-curtain air supply port, $T_s$ is the air supply temperature of the air-curtain air supply port, $T_j$ is a temperature near the indoor person, $V_s$ is an air supply speed of the air-curtain air supply port, $T_s$, $T_j$, and $V_s$ are detected through sensors, g is the gravity acceleration, x is the horizontal distance between the head of the indoor person and the air-curtain air supply port, $\alpha$ is a turbulence coefficient, d is the equivalent diameter of the air-curtain air supply port, $d=1.13\sqrt{ab}$, and a and b are length information and width information of a rectangle corresponding to the air-curtain air supply port.

2. The method according to claim 1, wherein the determining first accessibility of the pore-plate air supply port to a position of the target to be supplied with air, and second accessibility of the heat source to the position of the target to be supplied with air comprises:

in the case that the air supply temperature of the pore-plate air supply port increases from a preset initial temperature to a preset temperature, calculating a first temperature-increasing value of each indoor position;

subtracting the preset initial temperature from the preset temperature to obtain an air supply temperature-increasing value of the pore-plate air supply port;

dividing the first temperature-increasing value of each indoor position by the air supply temperature-increasing value to obtain accessibility of the pore-plate air supply port to each indoor position;

in the case that the heat source is turned on, calculating a second temperature-increasing value of each indoor position, and determining an average temperature-increasing value of indoor temperature increasing caused by the heat source;

dividing the second temperature-increasing value of each indoor position by the average temperature-increasing value to obtain accessibility of the heat source to each indoor position; and respectively determining first accessibility of the pore-plate air supply port to the position of the target to be supplied with air, and second accessibility of the heat source to the position of the target to be supplied with air according to the position information of the target to be supplied with air, the accessibility of the pore-plate air supply port to each indoor position, and the accessibility of the heat source to each indoor position.

3. The method according to claim 1, wherein the determining the target air supply mode to be an air-curtain air supply mode or the pore-plate air supply mode, calculating an air supply volume of the air-curtain air supply port or an air supply volume of the pore-plate air supply port according to the limited concentration of pollutants, and determining the air supply volume of the air-curtain air supply port or the air supply volume of the pore-plate air supply port to be the target air supply parameter comprises:

in the presence of sudden pollutants indoors, then determining the target air supply mode to be an air-curtain air supply mode, calculating an air supply volume of the air-curtain air supply port according to the limited concentration of the pollutants, and determining the air supply volume of the air-curtain air supply port to be the target air supply parameter; and in the absence of sudden pollutants indoors, then determining the target air supply mode to be a pore-plate air supply mode, calculating an air supply volume of the pore-plate air supply port according to the limited concentration of the pollutants, and determining the air supply volume of the pore-plate air supply port to be the target air supply parameter.

4. The method according to claim 1, wherein the controlling the air supply terminal to carry out air supply on the basis of the target air supply mode and the target air supply parameter comprises:

in the case that the target air supply mode is the pore-plate air supply mode, and the target air supply parameter is the air supply temperature of the pore-plate air supply port, controlling an adjustment motor for the air-curtain air supply port to adjust air curtain shutters to a first preset angle, controlling an adjustment motor for the pore-plate air supply port to adjust the angles of pore-plate air valve shutters to a second preset angle, and controlling the pore-plate air supply port to carry out air supply according to the air supply temperature of the pore-plate air supply port;

in the case that the target air supply mode is the air-curtain air supply mode, and the target air supply parameter is the air supply volume of the air-curtain air supply port, controlling the adjustment motor for the pore-plate air supply port to adjust the angles of the pore-plate air valve shutters to a first preset angle, controlling the adjustment motor for the air-curtain air supply port to adjust the air curtain shutters to a second preset angle, and controlling the air-curtain air supply port to carry out air supply according to the air supply volume of the air-curtain air supply port;

in the case that the target air supply mode is the pore-plate air supply mode, and the target air supply parameter is the air supply volume of the pore-plate air supply port, controlling the adjustment motor for the air-curtain air supply port to adjust the air curtain shutters to a first preset angle, controlling the adjustment motor for the pore-plate air supply port to adjust the angles of the pore-plate air valve shutters to a second preset angle, and controlling the pore-plate air supply port to carry out air supply according to the air supply volume of the pore-plate air supply port;

in the case that the target air supply mode is the air curtain-pore plate combined air supply mode, and the target air supply parameters are the air supply volume of the air-curtain air supply port and the air supply temperature of the pore-plate air supply port, respectively controlling the adjustment motor for the air-curtain air supply port and the adjustment motor for the pore-plate air supply port to adjust the air curtain shutters and the angles of the pore-plate air valve shutters to a second preset angle, and controlling the air-curtain air supply port and the pore-plate air supply port to carry out air supply according to the air supply volume of the air-curtain air supply port and the air supply temperature of the pore-plate air supply port;

in the case that the target air supply mode is the mixed air supply mode, and the target air supply parameter is the basic air supply angle, controlling the adjustment motor for the pore-plate air supply port to adjust the angles of the pore-plate air valve shutters to a first preset angle, and controlling the adjustment motor for the air-curtain air supply port to adjust the air curtain shutters to the basic air supply angle; and in the case that the target air supply mode is the directional air supply mode, and the target air supply parameter is the air supply angle calculated in real time, controlling the adjustment motor for the pore-plate air supply port to adjust the angles of the pore-plate air valve shutters to a first preset angle, and controlling the adjustment motor for the air-curtain air supply port to adjust the air curtain shutters to the air supply angle calculated in real time.

5. A multi-mode air supply terminal, the multi-mode air supply terminal is the air supply terminal described in claim 1, and comprising a shell body (2) as well as a pore-plate air supply mechanism and an air-curtain air supply mechanism (4) which are installed inside the shell body (2); the shell body (2) is connected with one end of an air supply branch pipe (1), the air-curtain air supply mechanism (4) is arranged around the pore-plate air supply mechanism, and an inner wall of the shell body (2) forms an empty cavity (6) with the pore-plate air supply mechanism and the air-curtain air supply mechanism (4); and the pore-plate air supply mechanism and the air-curtain air supply mechanism (4) are respectively used for controlling opening/closing of a pore-plate air supply port and an air-curtain air supply port to form a plurality of air supply modes, so that functions of thermal comfort guarantee, pollutant blocking, as well as ventilation and air exchange are realized.

6. The method according to claim 1, further comprising:

determining the target to be supplied with air is not located at the set position according to the position information, and does not have a mixed ventilation requirement, then determining the target air supply mode to be a directional air supply mode, calculating an air supply angle of the air-curtain air supply port in real time according to the position information, and determining the calculated air supply angle to be the target air supply parameter;

determining the target to be supplied with air is not located at the set position according to the position information, and has a mixed ventilation requirement, then determining the target air supply mode to be a mixed air supply mode, and determining the target air supply parameter to be a basic air supply angle.

7. The method according to claim 6, wherein the controlling the air supply terminal to carry out air supply on the basis of the target air supply mode and the target air supply parameter comprises:

in the case that the target air supply mode is the pore-plate air supply mode, and the target air supply parameter is the air supply temperature of the pore-plate air supply port, controlling an adjustment motor for the air-curtain air supply port to adjust air curtain shutters to a first preset angle, controlling an adjustment motor for the pore-plate air supply port to adjust the angles of pore-plate air valve shutters to a second preset angle, and controlling the pore-plate air supply port to carry out air supply according to the air supply temperature of the pore-plate air supply port;

in the case that the target air supply mode is the air-curtain air supply mode, and the target air supply parameter is the air supply volume of the air-curtain air supply port, controlling the adjustment motor for the pore-plate air supply port to adjust the angles of the pore-plate air valve shutters to a first preset angle, controlling the adjustment motor for the air-curtain air supply port to adjust the air curtain shutters to a second preset angle, and controlling the air-curtain air supply port to carry out air supply according to the air supply volume of the air-curtain air supply port;

in the case that the target air supply mode is the pore-plate air supply mode, and the target air supply parameter is the air supply volume of the pore-plate air supply port, controlling the adjustment motor for the air-curtain air supply port to adjust the air curtain shutters to a first preset angle, controlling the adjustment motor for the pore-plate air supply port to adjust the angles of the pore-plate air valve shutters to a second preset angle, and controlling the pore-plate air supply port to carry out air supply according to the air supply volume of the pore-plate air supply port;

in the case that the target air supply mode is the air curtain-pore plate combined air supply mode, and the target air supply parameters are the air supply volume of the air-curtain air supply port and the air supply temperature of the pore-plate air supply port, respectively controlling the adjustment motor for the air-curtain air supply port and the adjustment motor for the pore-plate air supply port to adjust the air curtain shutters and the angles of the pore-plate air valve shutters to a second preset angle, and controlling the air-curtain air supply port and the pore-plate air supply port to carry out air supply according to the air supply volume of the air-curtain air supply port and the air supply temperature of the pore-plate air supply port;

in the case that the target air supply mode is the mixed air supply mode, and the target air supply parameter is the basic air supply angle, controlling the adjustment motor for the pore-plate air supply port to adjust the angles of the pore-plate air valve shutters to a first preset angle, and controlling the adjustment motor for the air-curtain air supply port to adjust the air curtain shutters to the basic air supply angle; and in the case that the target air supply mode is the directional air supply mode, and the target air supply parameter is the air supply angle calculated in real time, controlling the adjustment motor for the pore-plate air supply port to adjust the angles of the pore-plate air valve shutters to a first preset angle, and controlling the adjustment motor for the air-curtain air supply port to adjust the air curtain shutters to the air supply angle calculated in real time.

* * * * *